United States Patent
Gao et al.

(10) Patent No.: US 10,317,918 B2
(45) Date of Patent: Jun. 11, 2019

(54) THERMAL BYPASS VALVE

(71) Applicants: GM GLOBAL TECHNOLOGY OPERATIONS LLC, Detroit, MI (US); DYNALLOY, INC., Tustin, CA (US)

(72) Inventors: Xiujie Gao, Troy, MI (US); Kevin B. Rober, Washington, MI (US); Marco A. Lopes, Rochester Hills, MI (US); Nancy L. Johnson, Northville, MI (US); Anthony L. Smith, Troy, MI (US); Nicholas W. Pinto, Shelby Township, MI (US); Richard J. Skurkis, Lake Orion, MI (US); Tyler P. Ownby, Huntington Beach, CA (US)

(73) Assignees: GM Global Technology Operations LLC., Detroit, MI (US); Dynalloy, Inc., Tustin, CA (US)

( * ) Notice: Subject to any disclaimer, the term of this patent is extended or adjusted under 35 U.S.C. 154(b) by 82 days.

(21) Appl. No.: 15/587,801

(22) Filed: May 5, 2017

(65) Prior Publication Data

US 2017/0344036 A1    Nov. 30, 2017

Related U.S. Application Data

(60) Provisional application No. 62/343,452, filed on May 31, 2016, provisional application No. 62/343,465, (Continued)

(51) Int. Cl.
*F16K 31/00* (2006.01)
*G05D 23/13* (2006.01)
*G05D 23/185* (2006.01)

(52) U.S. Cl.
CPC ....... *G05D 23/1852* (2013.01); *F16K 31/002* (2013.01); *G05D 23/1333* (2013.01)

(58) Field of Classification Search
CPC ............. F16H 57/0413; F16H 57/0435; F16K 31/002; G05D 23/1333; G05D 23/1852
(Continued)

(56) References Cited

U.S. PATENT DOCUMENTS 4,190,198 A * 2/1980 Casuga .................. F01M 5/007
                                                                236/34.5
5,564,317 A * 10/1996 Gilroy ................. F16H 57/0413
                                                                137/565.35
(Continued)

FOREIGN PATENT DOCUMENTS

CN        102954198 A        3/2013
CN        103133671 A        6/2013

*Primary Examiner* — Henry T Crenshaw
(74) *Attorney, Agent, or Firm* — Quinn IP Law

(57) ABSTRACT

A thermal bypass valve includes a housing defining a bore along a longitudinal axis and having two inlet ports and two outlet ports; a cap disposed within the bore; a shuttle disposed within the bore and reversibly translatable towards and away from the cap along the longitudinal axis between a first fill position, a cooling position, and a bypass position; and an actuator configured for translating the shuttle along the longitudinal axis between the cooling position and the bypass position. The actuator is formed from a shape memory alloy and is transitionable between a first state and a second state in response to a temperature of the fluid.

13 Claims, 19 Drawing Sheets

Related U.S. Application Data filed on May 31, 2016, provisional application No. 62/343,481, filed on May 31, 2016.

(58) Field of Classification Search
USPC .................................................. 236/101 A
See application file for complete search history.

(56) References Cited

U.S. PATENT DOCUMENTS

| | | | |
|---|---|---|---|
| 2007/0164123 A1* | 7/2007 | Willers | F16H 57/0413 236/93 R |
| 2009/0211850 A1* | 8/2009 | Moorman | F16H 61/0021 184/6.12 |
| 2010/0126594 A1* | 5/2010 | Sheppard | F01P 7/16 137/340 |
| 2011/0197982 A1* | 8/2011 | Moorman | F16H 61/0031 137/565.11 |
| 2012/0111955 A1* | 5/2012 | Moser | F01M 5/007 236/93 R |
| 2013/0042927 A1* | 2/2013 | Neelakantan | F16H 57/0413 137/334 |
| 2013/0139906 A1* | 6/2013 | Neelakantan | F16K 11/07 137/334 |
| 2015/0211395 A1* | 7/2015 | Gooden | F01M 5/007 165/280 |
| 2015/0233465 A1 | 8/2015 | Gao et al. | |
| 2017/0089456 A1* | 3/2017 | Dewey | F16H 61/0267 |

\* cited by examiner

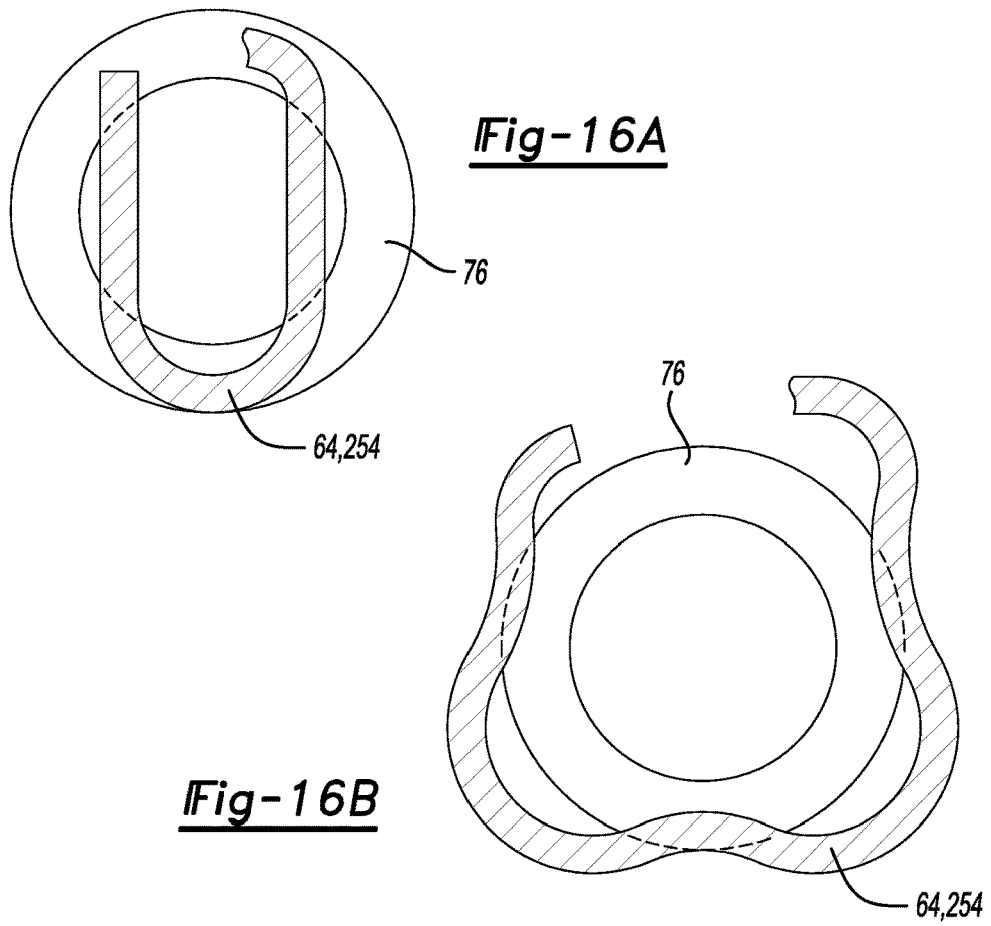
Fig-16A
Fig-16B
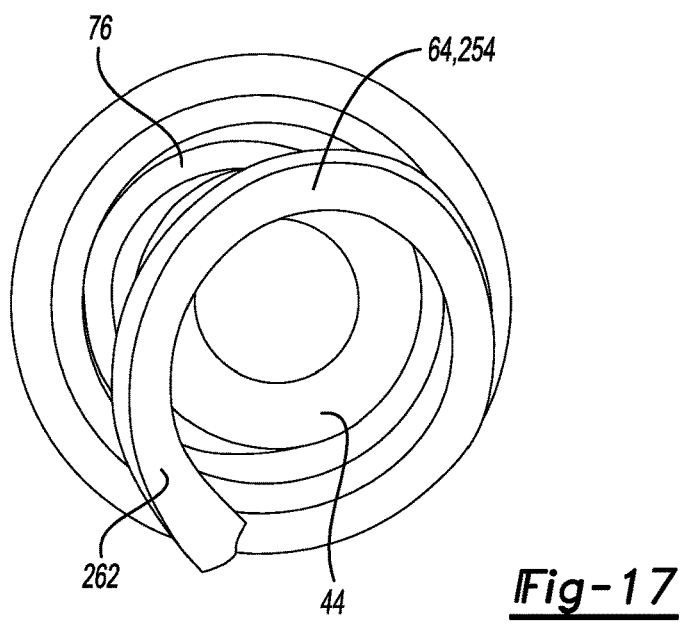
Fig-17

THERMAL BYPASS VALVE

CROSS-REFERENCE TO RELATED APPLICATIONS

This application claims the benefit of U.S. Provisional Patent Application No. 62/343,452, filed on May 31, 2016; U.S. Provisional Patent Application No. 62/343,465, filed on May 31, 2016; and U.S. Provisional Patent Application No. 62/343,481, filed on May 31, 2016, which is each hereby incorporated by reference in its entirety.

INTRODUCTION

The disclosure relates to a thermal bypass valve.

To operate properly, a device for a vehicle or for a non-automotive application may require a supply of fluid, such as an oil, that may be used for functions such as cooling and lubrication. The lubricating and cooling capabilities of the fluid often affect a reliability and durability of the device. For example, multi-speed power devices require the fluid for controlled engagement and disengagement, on a desired schedule, of various torque transmitting mechanisms that operate to establish speed ratios within an internal gear arrangement.

SUMMARY

A thermal bypass valve configured for selectively directing a flow of a fluid from a device to a cooler includes a housing having a capped end, a longitudinal axis, and a non-capped end spaced apart from the capped end along the longitudinal axis. The housing defines a bore extending along the longitudinal axis; a first inlet port disposed in fluid communication with the bore; a second outlet port disposed in fluid communication with the bore and selectively disposable in fluid communication with the first inlet port; a third inlet port disposed in fluid communication with the bore and selectively disposable in fluid communication with the second outlet port; and a fourth outlet port disposed in fluid communication with the bore and the third inlet port, and selectively disposable in fluid communication with the first inlet port. The thermal bypass valve also includes a cap disposed within the bore at the capped end, and a shuttle disposed within the bore. The shuttle is reversibly translatable towards and away from the cap along the longitudinal axis between: a first fill position in which the first inlet port is disposed in fluid communication with both the second outlet port and the fourth outlet port, and the third inlet port is disposed in fluid communication with the second outlet port; a cooling position in which the first inlet port is disposed in fluid communication with the fourth outlet port, and the third inlet port is disposed in fluid communication with the second outlet port; and a bypass position in which the first inlet port is disposed in fluid communication with the second outlet port. In addition, the thermal bypass valve includes an actuator configured for translating the shuttle along the longitudinal axis between the cooling position and the bypass position. The actuator is formed from a shape memory alloy and is transitionable between a first state and a second state in response to a temperature of the fluid.

The shape memory alloy may transition between the first state and the second state to translate the shuttle from the bypass position to the cooling position.

The thermal bypass valve may further include a bias resilient member attached to the shuttle and configured for translating the shuttle along the longitudinal axis from the cooling position to the bypass position as the shape memory alloy cools.

In one aspect, the shuttle may be configured as a cylinder, may define a first cavity therein along the longitudinal axis, and may have a first end and a second end spaced apart from the first end. The cap may define a second cavity therein and may have a third end and a fourth end spaced apart from the third end. Further, the bias resilient member may be disposed within the first cavity and the second cavity, may extend from the first end, and may be attached to the second end and the third end.

In another aspect, the housing may define a shoulder that is aligned with the first end when the shuttle is disposed in the cooling position.

In a further aspect, the housing may include a first ramp that defines the bore.

In yet another aspect, the cap may further define a conduit therein along the longitudinal axis that is configured for transmitting the fluid from the first inlet port to the second inlet port when the shuttle is disposed in one of the first fill position and the bypass position. Further, the shuttle may define a first channel therein that is coaxial with and surrounds the conduit. The shuttle may have a first end and a second end spaced apart from the first end. The cap may define a second channel therein along the longitudinal axis and may have a third end and a fourth end spaced apart from the third end. Further, the bias resilient member may be disposed within the first channel and the second channel and extend from the first end and the fourth end.

In one aspect, the second outlet port may be disposed at the non-capped end. The third inlet port may be disposed at the non-capped end and may be disposed between the first inlet port and the non-capped end. The fourth outlet port may be disposed at the capped end, and the shuttle may be disposed within the bore between the cap and the non-capped end.

Further, the shuttle may have a first end, a second end spaced apart from the first end, and a flange disposed between the first end and the second end. The cap may have a third end and a fourth end spaced apart from the third end. The bias resilient member may be coiled about the shuttle at the second end, and the actuator may be coiled about the shuttle and disposed between the flange and the cap at the first end.

The second end may seal against the housing and the first end may be spaced apart from the cap when the shuttle is disposed in the cooling position so that the fluid flows to the cooler. The first end may seal against the cap and the second end may be spaced apart from the housing when the shuttle is disposed in the bypass position so that the fluid does not flow to the cooler. The first end may be spaced apart from the cap and the second end may be spaced apart from the housing when the shuttle is disposed in the first fill position so that the fluid flows to the cooler.

In another embodiment, a thermal bypass valve configured for selectively directing a flow of a fluid from a device to a cooler includes a housing having a capped end and a non-capped end spaced apart from the capped end along a longitudinal axis. The housing defines a bore extending along the longitudinal axis; a first inlet port disposed in fluid communication with the bore; a second outlet port disposed at the non-capped end and in fluid communication with the bore, and selectively disposable in fluid communication with the first inlet port; a third inlet port disposed at the non-capped end and disposable in fluid communication with the bore, and selectively disposable in fluid communication with the second outlet port; and a fourth outlet port disposed at the capped end and in fluid communication with the bore and the third inlet port, and selectively disposable in fluid communication with the first inlet port. The third inlet port is disposed between the first inlet port and the non-capped end. The thermal bypass valve also includes a cap disposed within the bore at the capped end, and a shuttle disposed within the bore between the cap and the non-capped end. The shuttle is reversibly translatable towards and away from the cap along the longitudinal axis between: a first fill position in which the first inlet port is disposed in fluid communication with both the second outlet port and the fourth outlet port, and the third inlet port is disposed in fluid communication with the second outlet port; a cooling position in which the first inlet port is disposed in fluid communication with the fourth outlet port, and the third inlet port is disposed in fluid communication with the second outlet port; and a bypass position in which the first inlet port is disposed in fluid communication with the second outlet port. In addition, the thermal bypass valve includes an actuator configured for translating the shuttle along the longitudinal axis between the cooling position and the bypass position. The actuator is formed from a shape memory alloy and is transitionable between a first state and a second state in response to a temperature of the fluid.

In one aspect, the shuttle may have a first end and a second end spaced apart from the first end, and may define a slot through the shuttle at the second end that is configured for transmitting the fluid through the shuttle. The cap may have a third end and a fourth end spaced apart from the third end. The bias resilient member may abut the shuttle at the first end and may abut the housing. Further, the actuator may abut the second end and the third end and may be disposed between the first inlet port and the fourth outlet port.

In another aspect, the first end may seal against the housing, the second end may be spaced apart from the cap, and the actuator may decompress along the longitudinal axis when the shuttle is disposed in the cooling position so that the fluid flows to the cooler and does not flow to the second outlet port.

In a further aspect, the first end may be spaced apart from the housing, the second end may be spaced apart from the cap, and the actuator may compress along the longitudinal axis when the shuttle is disposed in the bypass position so that the fluid flows to the cooler and to the second outlet port.

In another embodiment, a thermal bypass valve configured for selectively directing a flow of a fluid from a device to a cooler includes a housing having a proximal end, a longitudinal axis, and a distal end spaced apart from the proximal end along the longitudinal axis. The housing defines a bore extending along the longitudinal axis; a first inlet port disposed in fluid communication with the bore; a second outlet port disposed in fluid communication with the bore and selectively disposable in fluid communication with the first inlet port; a third inlet port disposed in fluid communication with the bore and selectively disposable in fluid communication with the second outlet port; and a fourth outlet port disposed in fluid communication with the bore and the third inlet port, and selectively disposable in fluid communication with the first inlet port. The thermal bypass valve also includes a shuttle disposed within the bore. The shuttle has a sealing surface and is reversibly translatable along the longitudinal axis between: a first fill position in which the first inlet port is disposed in fluid communication with both the second outlet port and the fourth outlet port, the third inlet port is disposed in fluid communication with the second outlet port, and the sealing surface is spaced apart from the distal end; and a bypass position in which the first inlet port is disposed in fluid communication with the second outlet port, and the sealing surface abuts and seals against the distal end. In addition, the thermal bypass valve includes a compression coil spring attached to the housing and configured for translating the shuttle along the longitudinal axis between the first fill position and the bypass position. The compression coil is formed from a shape memory alloy and is transitionable between a first state and a second state in response to a temperature of the fluid.

In one aspect, the compression coil spring may have a primary end and a secondary end spaced apart from the first end. Further, the compression coil spring may have a top coil disposed in a first plane and a bottom coil spaced apart from the top coil and disposed in a second plane that is parallel to the first plane and perpendicular to the longitudinal axis. Also, the secondary end may be bent such that the secondary end is not parallel to the longitudinal axis when the shuttle is disposed in the first fill position.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 16A is a schematic illustration of a cross-sectional view of a second embodiment of the compression coil spring of FIG. 15A.

FIG. 16B is a schematic illustration of a cross-sectional view of a third embodiment of the compression coil spring of FIG. 15A.

FIG. 17 is a schematic illustration of a perspective view of a fourth embodiment of the compression coil spring of FIG. 15A.

DETAILED DESCRIPTION

Figure 1:
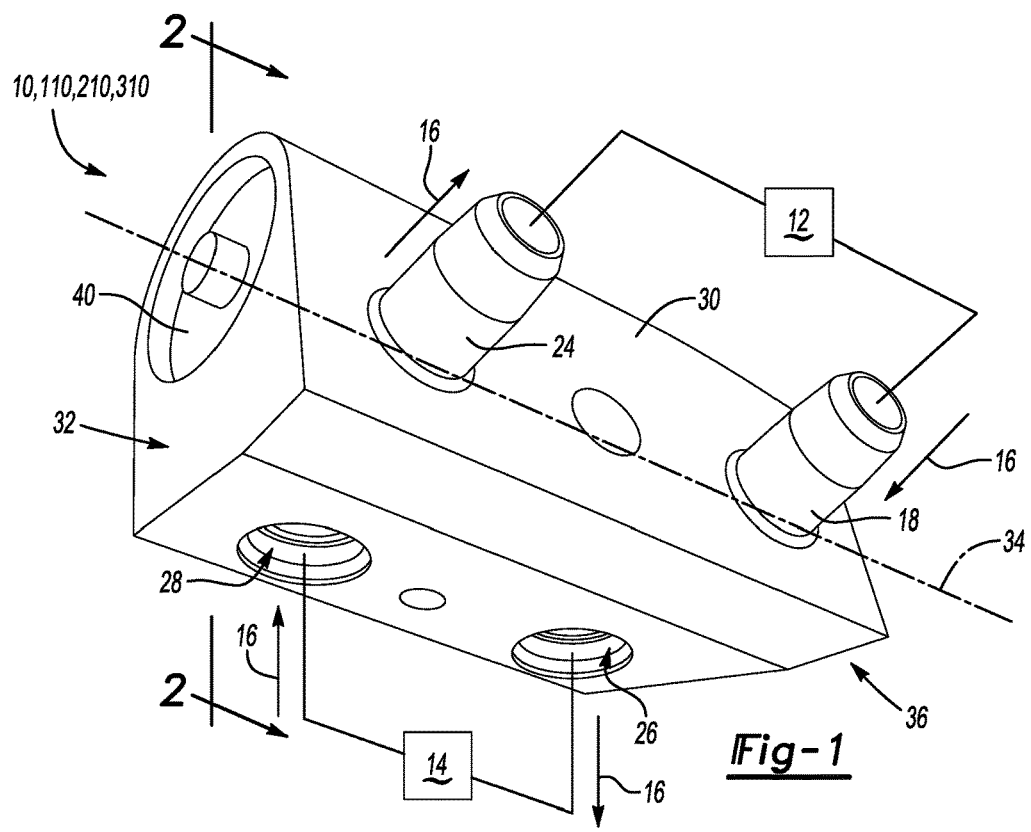
FIG. 1 is a schematic illustration of a perspective view of a thermal bypass valve.

Referring to the Figures, wherein like reference numerals refer to like elements, a thermal bypass valve 10 is shown generally in FIGS. 1-4, and other embodiments of the thermal bypass valve 110, 210, 310, 410, 510 are shown in FIGS. 5-30. The thermal bypass valve 10, 110, 210, 310, 410, 510 may be useful for fluid circuits which include a device 12 and a cooler 14. As will be explained in more detail below, the thermal bypass valve 10, 110, 210, 310, 410, 510 is configured for selectively directing a flow of a fluid (shown generally by arrows 16 in FIG. 1) from the device 12 to the cooler 14. That is, the thermal bypass valve 10, 110, 210, 310, 410, 510 may be configured for regulating or modulating a circulation of the fluid 16 between the device 12 and the cooler 14, and may function as a diverter valve. As such, the thermal bypass valve 10, 110, 210, 310, 410, 510 may be useful for devices 12 which require controlled, precise, reliable, and on-demand cooling and/or fluid distribution to specific portions of the device 12. The thermal bypass valve 10, 110, 210, 310, 410, 510 may minimize fluid and energy waste, and may accurately seal off unwanted fluid flow to one or more portions of the device 12.

Therefore, the device 12 may be used for a variety of applications, such as for an automatic transmission of a vehicle, such as an automotive vehicle or a construction vehicle, which is configured for receiving and expelling the fluid 16. The fluid 16 may be an automatic transmission fluid (ATF), an oil, and the like. Alternatively, the device 12 may be incorporated in applications other than vehicles. For example, the device 12 may be incorporated into heating, ventilation, and air conditioning (HVAC) systems of buildings, boats, aircraft, appliances, and the like, and may be useful for non-vehicular applications such as, but not limited to, residential pressurized fluid distribution and recreational and industrial devices.

Although described in greater detail below, the device 12 and the cooler 14 are each in fluid communication with the thermal bypass valve 10, 110, 210, 310, 410, 510, and the cooler 14 is configured to cool the fluid 16 received therein. During operation, as best described with reference to FIG. 1, the fluid 16 is exhausted from the device 12 through a first inlet port 18 and enters the thermal bypass valve 10, 110, 210, 310, 410, 510 through the first inlet port 18. The thermal bypass valve 10, 110, 210, 310, 410, 510 is configured to move between at least a bypass position 20 (FIGS.

6 and 8) and a cooling position 22 (FIGS. 3, 7, and 9) as a function of a temperature of the fluid 16, as set forth in more detail below. Referring specifically to FIG. 1, when the temperature of the fluid 16 is less than or equal to a threshold temperature, the fluid 16 does not require cooling and the thermal bypass valve 10, 110, 210, 310, 410, 510 is disposed in the bypass position 20. When the thermal bypass valve 10, 110, 210, 310, 410, 510 is in the bypass position 20, the fluid 16 is exhausted from the thermal bypass valve 10, 110, 210, 310, 410, 510 through a second outlet port 24 and enters the device 12, thus bypassing the cooler 14. However, when the temperature of the fluid 16 is greater than the threshold temperature, the fluid 16 requires cooling to a lower temperature and the thermal bypass valve 10, 110, 210, 310, 410, 510 operates in the cooling position 22. When the thermal bypass valve 10, 110, 210, 310, 410, 510 is disposed in the cooling position 22, the fluid 16 is exhausted from the thermal bypass valve 10, 110, 210, 310, 410, 510 through a fourth outlet port 26 and enters the cooler 14. The fluid 16 is then cooled inside the cooler 14 and the fluid 16 subsequently enters the thermal bypass valve 10, 110, 210, 310, 410, 510 through a third inlet port 28. Finally, the fluid 16 is exhausted from the thermal bypass valve 10, 110, 210, 310, 410, 510 through the second outlet port 24 and transmitted to the device 12. Therefore, by directing the fluid 16 to the cooler 14 solely when the fluid 16 is greater than the threshold temperature, the cooler 14 operates selectively, which results in energy savings by preventing unnecessary operation of the cooler 14 at temperatures less than or equal to the threshold temperature.

Referring now to FIG. 1, the thermal bypass valve 10 includes a housing 30 having a capped end 32, a longitudinal axis 34, and a non-capped end 36 spaced apart from the capped end 32 along the longitudinal axis 34. As best shown in FIG. 1, the non-capped end 36 may be truncated to reduce a weight of the thermal bypass valve 10. The capped end 32 may be generally configured for inserting components of the thermal bypass valve 10 into the housing 30.

Figure 2:
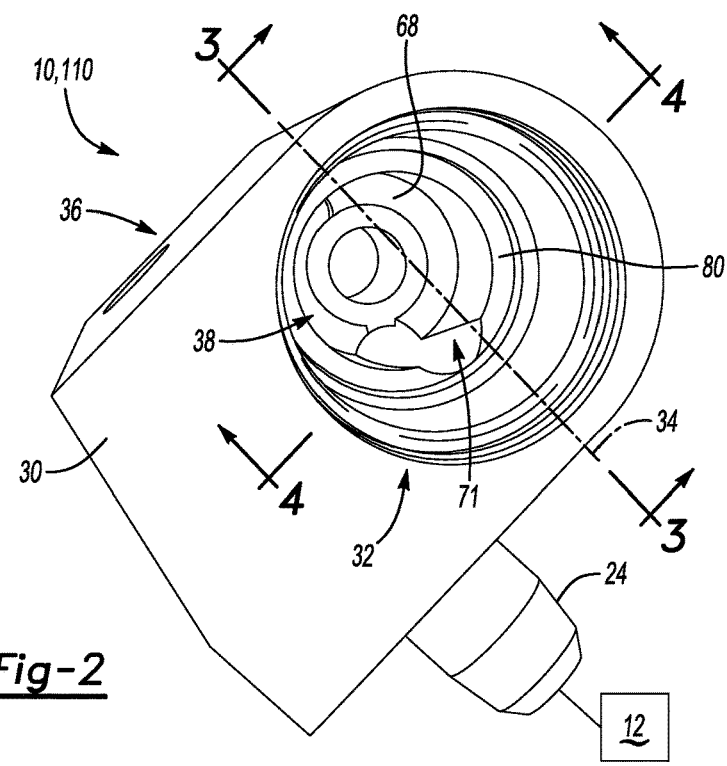
FIG. 2 is a schematic illustration of a perspective end view of the thermal bypass valve of FIG. 1.
Figure 3:
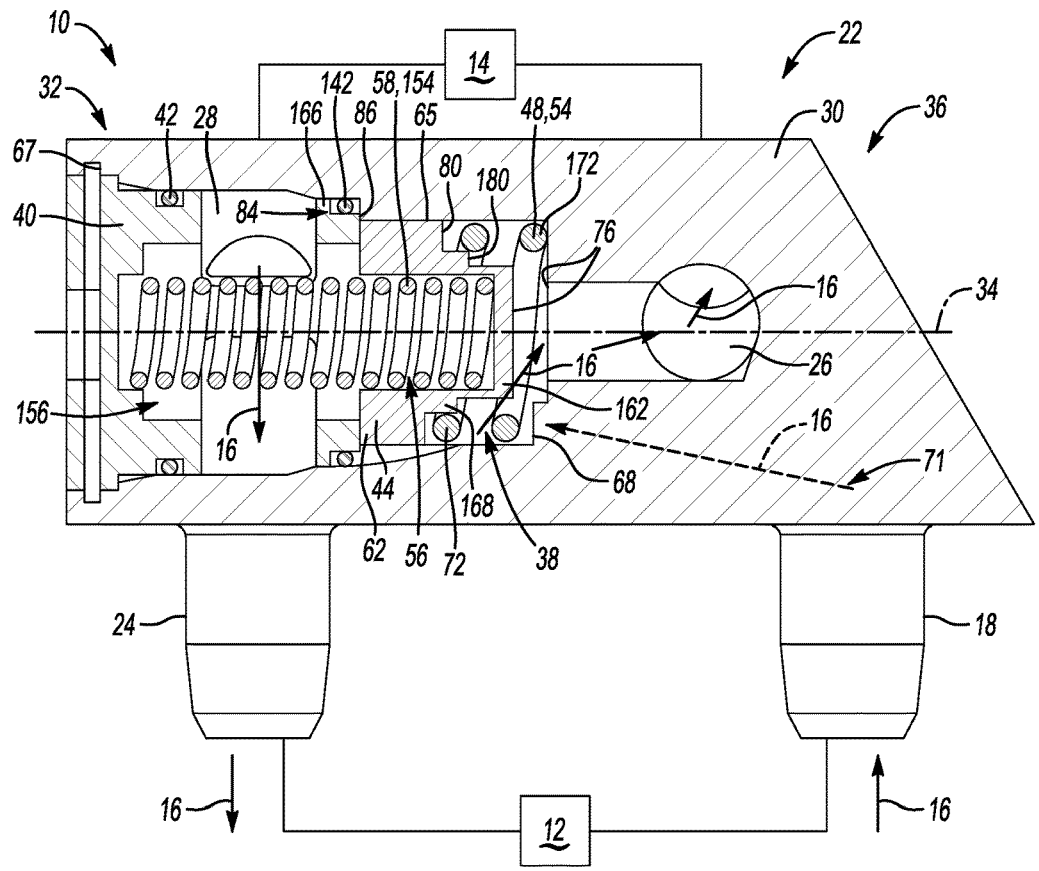
FIG. 3 is a schematic illustration of a cross-sectional view of the thermal bypass valve of FIG. 2 taken along section lines 3-3.

As shown in FIGS. 2 and 3, the housing 30 defines a bore 38 extending along the longitudinal axis 34 and the first inlet port 18 is disposed in fluid communication with the bore 38. The bore 38 is configured for receiving and expelling the fluid 16. For applications in which the thermal bypass valve 10 is mounted to a transmission for a vehicle, the first inlet port 18 may be configured for conveying the fluid 16, e.g., a transmission fluid, from the device 12, i.e., the transmission, to the bore 38. Therefore, the first inlet port 18 may be characterized as a "from the device 12" inlet port.

Referring to FIG. 3, the housing 30 also defines the second outlet port 24 disposed in fluid communication with the bore 38 and selectively disposable in fluid communication with the first inlet port 18. For example, the second outlet port 24 may be configured for removing the fluid 16 from the housing 30. For the transmission application described above, the second outlet port 24 may be configured for transmitting the fluid 16 from the bore 38 to the transmission. That is, the second outlet port 24 may be characterized as a "to the device 12" outlet port.

Further, as described in more detail below, during certain operating conditions, e.g., when the temperature of the fluid 16 is comparatively cool, the thermal bypass valve 10 may convey fluid directly from the first inlet port 18 to the second outlet port 24. However, during other operating conditions, e.g., when the temperature of the fluid 16 is comparatively warm, the thermal bypass valve 10 may direct the fluid 16 to the cooler 14 such that the first inlet port 18 is not disposed in direct fluid communication with the second outlet port 24. As such, the second outlet port 24 may selectively convey the fluid 16.

As described with continued reference to FIG. 3, the housing 30 also defines the third inlet port 28 disposed in fluid communication with the bore 38 and selectively disposable in fluid communication with the second outlet port 24. For example, the third inlet port 28 may convey the fluid 16 from the cooler 14 to the bore 38. Therefore, during certain operating conditions, e.g., when the fluid 16 is relatively warm and is transmitted from the bore 38 to the cooler 14 for cooling, the third inlet port 28 may convey the cooled fluid back to the bore 38 from the cooler 14, and then on to the second outlet port 24. As such, the third inlet port 28 may be characterized as a "from the cooler 14" inlet port.

In addition, the housing 30 also defines the fourth outlet port 26 disposed in fluid communication with the bore 38 and the third inlet port 28. That is, the fourth outlet port 26 may convey the fluid 16 out of the housing 30 and to the cooler 14. The fourth outlet port 26 may also be selectively disposable in fluid communication with the first inlet port 18. For example, during certain operating conditions, e.g., when the temperature of the fluid 16 is comparatively warm, the thermal bypass valve 10 may direct the fluid 16 to the cooler 14 such that the fourth outlet port 26 is disposed in fluid communication with the first inlet port 18. Therefore, the fourth outlet port 26 may be characterized as a "to the cooler 14" outlet port.

Figure 5:
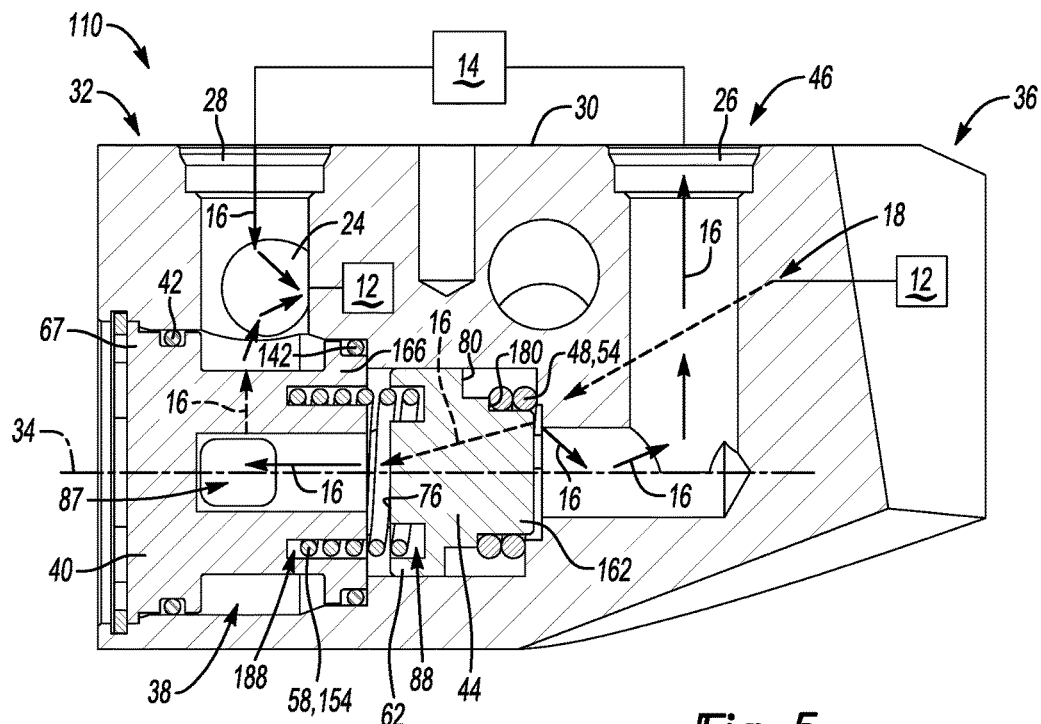
FIG. 5 is a schematic illustration of a cross-sectional view of a second embodiment of the thermal bypass valve of FIG. 1.

In a first embodiment described with reference to FIG. 3 and in a second embodiment described with reference to FIGS. 5-7, the third inlet port 28 is disposed at the capped end 32, and the fourth outlet port 26 is disposed between the third inlet port 28 and the non-capped end 36.

Figure 8:
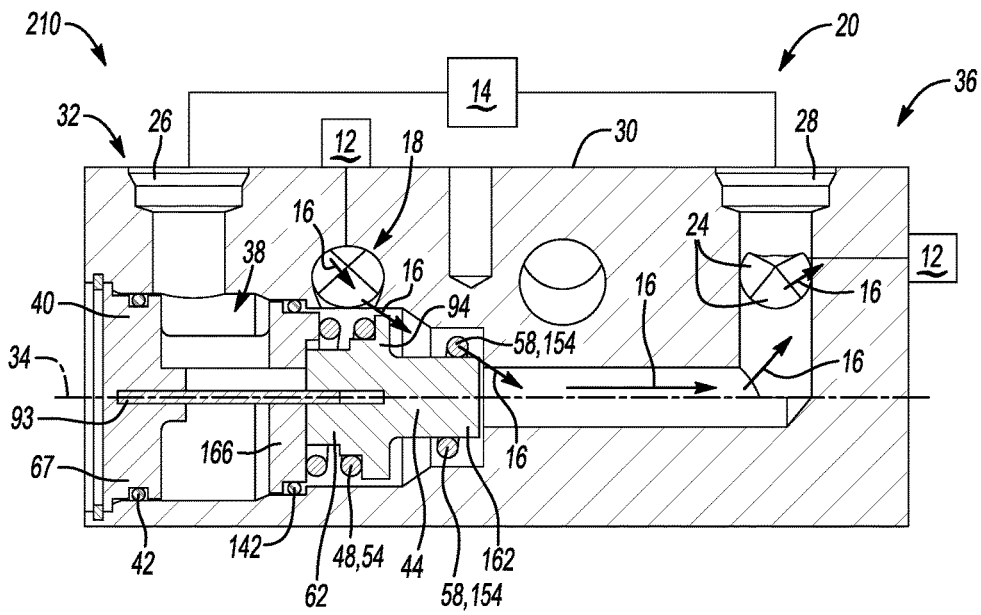
FIG. 8 is a schematic illustration of a cross-sectional view of a third embodiment of the thermal bypass valve of FIG. 1 in which the shuttle is disposed in the bypass position.

However, in a third embodiment described with reference to FIGS. 8 and 9, the second outlet port 24 may be disposed at the non-capped end 36, and the third inlet port 28 may be disposed at the non-capped end 36 and may be disposed between the first inlet port 18 and the non-capped end 36. Further, the fourth outlet port 26 may be disposed at the capped end 32. That is, the third embodiment may be characterized as a "flipped" configuration or arrangement when compared to the first and second embodiments.

As best shown in FIGS. 1 and 3, the thermal bypass valve 10 also includes a cap 40 disposed within the bore 38 at the capped end 32. The cap 40 may be removable from the housing 30 such that components of the thermal bypass valve 10 may be inserted into the housing 30 during assembly. The cap 40 may include a first elastomeric seal 42 and a second elastomeric seal 142 spaced apart from the first elastomeric seal 42. For example, the first and second elastomeric seals 42, 142 may be compressible o-ring seals configured to prevent the fluid 16 from escaping from the bore 38 through the cap 40.

Referring now to FIG. 3, the thermal bypass valve 10 also includes a shuttle 44 disposed within the bore 38 and reversibly translatable towards and away from the cap 40 along the longitudinal axis 34 between:

a first fill position 46 (FIG. 5) in which the first inlet port 18 is disposed in fluid communication with both the second outlet port 24 and the fourth outlet port 26, and the third inlet port 28 is disposed in fluid communication with the second outlet port 24;

the cooling position 22 (FIGS. 3, 7, and 9) in which the first inlet port 18 is disposed in fluid communication with the fourth outlet port 26, and the third inlet port 28 is disposed in fluid communication with the second outlet port 24;

and the bypass position 20 (FIGS. 6 and 8) in which the first inlet port 18 is disposed in fluid communication with the second outlet port 24.

More specifically, although described in more detail below, the thermal bypass valve 10 may be disposed in the first fill position 46 during initial attachment of the thermal bypass valve 10 to the device 12. That is, the first fill position 46 may be useful for checking the thermal bypass valve 10 and the device 12 for leaks. The thermal bypass valve 10 may be disposed in the cooling position 22 when the temperature of the fluid 16 exceeds the threshold temperature. That is, when the thermal bypass valve 10 is disposed in the cooling position 22, the fluid 16 may travel through the cooler 14 before returning back to the device 12. Conversely, the thermal bypass valve 10 is disposed in the bypass position 20 when the temperature of the fluid 16 is less than or equal to the threshold temperature. That is, when the thermal bypass valve 10 is disposed in the bypass position 20, the fluid 16 may not travel through the cooler 14 but may instead solely travel to and from the device 12.

In addition, as shown in FIGS. 3 and 5-7, the thermal bypass valve 10, 110 also includes an actuator 48 configured for translating the shuttle 44 along the longitudinal axis 34 between the cooling position 22 and the bypass position 20. The actuator 48 is formed from a shape memory alloy and is transitionable or translatable between a first state 50 (FIG. 6) and a second state 52 (FIG. 7) in response to the temperature of the fluid 16. Therefore, as set forth in more detail below, the shape memory alloy transitions between the first state 50 and the second state 52 to translate the shuttle 44 from the bypass position 20 to the cooling position 22.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between a martensite phase, i.e., "martensite", and an austenite phase, i.e., "austenite". That is, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. Further, the martensite phase generally refers to the comparatively lower-temperature phase and is often more deformable than the comparatively higher-temperature austenite phase.

The temperature at which the shape memory alloy begins to change from the austenite phase to the martensite phase is known as the martensite start temperature, $M_s$. The temperature at which the shape memory alloy completes the change from the austenite phase to the martensite phase is known as the martensite finish temperature, $M_f$, or transformation temperature, $T_{trans}$. Similarly, as the shape memory alloy is heated, the temperature at which the shape memory alloy begins to change from the martensite phase to the austenite phase is known as the austenite start temperature, $A_s$. The temperature at which the shape memory alloy completes the change from the martensite phase to the austenite phase is known as the austenite finish temperature, $A_f$, or transformation temperature, $T_{trans}$.

The shape memory alloy may have a suitable form, i.e., shape. For example, the shape memory alloy may be configured as a shape-changing element such as a wire, spring, resilient member, tape, band, continuous loop, and combinations thereof. Further, the shape memory alloy may have a suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or a higher order so long as the shape memory alloy exhibits a shape memory effect, e.g., a change in shape orientation, damping capacity, and the like. Generally, the shape memory alloy may be selected according to desired operating temperatures of the device 12, cooler 14, and thermal bypass valve 10, 110, 210, 310, 410, 510. In one specific example, the shape memory alloy may include nickel and titanium.

The shape memory alloy exhibits a temperature hysteresis in its phase transformations. A magnitude of the temperature hysteresis is typically between five degrees and forty degrees Celsius (° C.). A specific magnitude of the temperature hysteresis in a particular application is a function of several parameters, including the material formulation of the shape memory alloy and the stress state of the shape memory alloy.

Therefore, in one non-limiting example, the shape memory alloy may be configured as a first compression coil spring 54, e.g., a helix, that decompresses and increases in pitch along the longitudinal axis 34 in response to an increase in the temperature of the fluid 16 to thereby translate the shuttle 44 from the bypass position 20 to the cooling position 22. For example, the first compression coil spring 54 may have a helical shape and may compress and decompress along the longitudinal axis 34 to translate the shuttle 44. The shape memory alloy is configured to be activated in response to the temperature of the fluid 16 in the bore 38 having at least a first temperature that is greater than the threshold temperature such that the actuation of the shape memory alloy activates the actuator 48 and the actuator 48 longitudinally extends in length. Likewise, the shape memory alloy is configured to be deactivated in response to the temperature of the fluid 16 in the bore 38 when the temperature of the fluid 16 is a second temperature that is less than or equal to the threshold temperature and the first temperature, such that the shape memory alloy deactivates and the actuator 48 longitudinally retracts in length. As such, due to the increase in length of the actuator 48 when the actuator 48 is activated, a spring force of the first compression coil spring 54 applied by the actuator 48 is greater than the spring force of the first compression coil spring 54 when the actuator 48 is deactivated.

The first compression coil spring 54 formed from the shape memory alloy may be characterized by the first state 50 (FIG. 6), i.e., when a temperature of the shape memory alloy is below the martensite finish temperature, $M_f$, or transformation temperature, $T_{trans}$, of the shape memory alloy. Likewise, the first compression coil spring 54 formed from the shape memory alloy may also be characterized by the second state 52 (FIG. 7), i.e., when the temperature of the shape memory alloy is above the austenite finish temperature, $A_f$, or transformation temperature, $T_{trans}$, of the shape memory alloy. In addition, although not shown, the device 12, cooler 14, and/or a system or fluid circuit (not shown) including the device 12 and/or cooler 14 may include a plurality of shape memory alloys and/or a plurality of first compression coil springs 54. Further, the shape memory alloy may contact the fluid 16. That is, the actuator 48 may be disposed in and/or surrounded by the fluid 16.

Referring now to FIGS. 3 and 5-11, the thermal bypass valve 10, 110, 210, 310 may also include a bias resilient member 58 attached to the shuttle 44 and configured for translating the shuttle 44 along the longitudinal axis 34 from the cooling position 22 to the bypass position 20 as the shape memory alloy cools. That is, the bias resilient member 58 may reset the thermal bypass valve 10 after the temperature of the fluid 16 is once again less than or equal to the threshold temperature to thereby translate the shuttle 44 from the cooling position 22 to the bypass position 20. That is, the bias resilient member 58 may return the shuttle 44 to the bypass position 20, i.e., may bias the shuttle 44 to the bypass position 20, when the temperature of the fluid 16 is less than or equal to the threshold temperature. As such, the bypass position 20 may be characterized as a starting or default position.

In particular, the actuator 48 may have a first diameter 60 (FIG. 7) when the shuttle 44 is disposed in the cooling position 22, and the bias resilient member 58 may be configured as a second compression coil spring 154 (FIG. 6) that has a second diameter 160 (FIG. 6) that is less than the first diameter 60, and decompresses along the longitudinal axis 34 to translate the shuttle 44 from the cooling position 22 to the bypass position 20.

Referring now to FIG. 3 and the first embodiment of the thermal bypass valve 10, the shuttle 44 may be configured as a cylinder, may define a first cavity 56 therein along the longitudinal axis 34, and may have a first end 62, a second end 162 spaced apart from the first end 62, and an external surface 65 extending between the first end 62 and the second end 162. The external surface 65 may precisely align with the housing 30 within the bore 38 so that the shuttle 44 may efficiently translate towards and away from the capped end 32 along the longitudinal axis 34. That is, the housing 30 and the shuttle 44 may cooperate to align the translation of the shuttle 44 within the bore 38. Further, the cap 40 may define a second cavity 156 therein and may have a third end 67 and a fourth end 166 spaced apart from the third end 67. In addition, for the first embodiment, the bias resilient member 58 may be disposed within the first cavity 56 and the second cavity 156, extend from the first end 62, and may be attached to the second end 162 and the third end 67.

Figure 4:
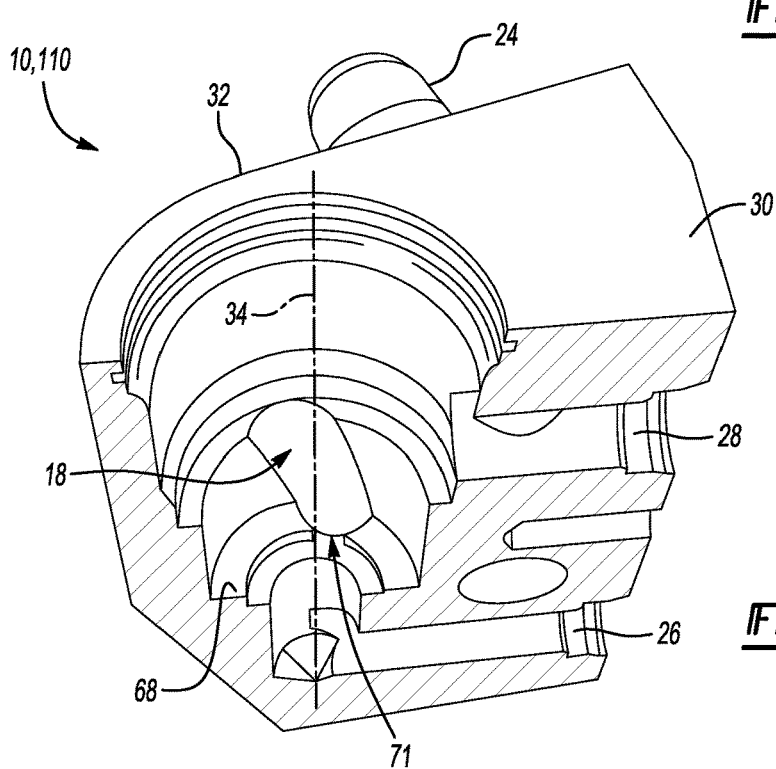
FIG. 4 is a schematic illustration of a cross-sectional view of the thermal bypass valve of FIG. 2 taken along section lines 4-4.

Referring now to FIGS. 2-4, the housing 30 may include a first ramp 68 that defines the bore 38. That is, the first ramp 68 may be formed from an inclined surface near the non-capped end 36 of the housing 30. The first ramp 68 may have a pitch that varies along the first ramp 68. Further, as best shown in FIG. 4, the first ramp 68 may define a fluid channel 71 through the first ramp 68 that is inclined (as represented by arrow 16 in FIG. 3) with respect to the longitudinal axis 34 and is configured for transmitting the fluid 16 from the first inlet port 18 to the bore 38. The fluid channel 71 may allow for a reduced size of the bore 38 and may provide space for tools that place the shuttle 44 and actuator 48 within the bore 38 during assembly of the thermal bypass valve 10. Further, if the fluid channel 71 was not defined through the first ramp 68, the actuator 48 may otherwise block fluid flow along the first ramp 68 when the temperature of the fluid 16 is comparatively cold and/or when the shuttle 44 is disposed in the first fill position 46. However, the fluid channel 71 allows the fluid 16 to flow uninhibited from the first inlet port 18 to the bore 38 during each of the bypass position 20, the cooling position 22, and the first fill position 46. Additionally or alternatively, the first ramp 68 may define a plurality of slots or holes (not shown) therein to allow uninhibited fluid flow.

The fluid channel 71 may have a suitable cross-sectional shape. For example, the fluid channel 71 may have a circular or square cross-sectional shape. It may be advantageous for the fluid channel 71 to have a square cross-sectional shape to reduce the weight of the thermal bypass valve 10. Further, the fluid channel 71 may also curve about or encircle the longitudinal axis 34 in addition to being inclined with respect to the longitudinal axis 34.

Referring now to FIG. 3, the shuttle 44 may also include a second ramp 168 that is matable with the first ramp 68 such that the actuator 48 includes a top end 72 that abuts the second ramp 168 and a bottom end 172 that abuts the first ramp 68. That is, the actuator 48 may seat against the first ramp 68 and the second ramp 168. More specifically, the second ramp 168 may include a first step 80 disposed between the first end 62 and the second end 162 and a second step 180 disposed between the first step 80 and the second end 162. The top end 72 may seat against and abut the second step 180 when the shuttle 44 is disposed in the first fill position 46, and may seat against and abut the first step 80 when the shuttle 44 is disposed in the cooling position 22 and the bypass position 20.

That is, the shape memory alloy may have a cold, deformed shape when exposed to the fluid 16 having the temperature that is less than or equal to the threshold temperature. Likewise, the shape memory alloy may have a hot, remembered shape when exposed to the fluid 16 having the temperature that is greater than the threshold temperature. In addition, however, the shape memory alloy may also have an initial, single-use, as-formed shape. As best shown in FIG. 5, the actuator 48 when formed as the first compression coil spring 54 may seat against the second step 180 when the shape memory alloy has the as-formed shape solely when the shuttle is disposed in the first fill position 46. As such, the second end 162 of the shuttle 44 may be slightly spaced apart from the housing 30 so that the fluid 16 can flow to both the cooler 14 and the device 12. Such fluid flow allows an assembler to check for leaks and/or misconnections when the thermal bypass valve 10 is assembled to and in fluid communication with the device 12 and the cooler 14.

Figure 6:
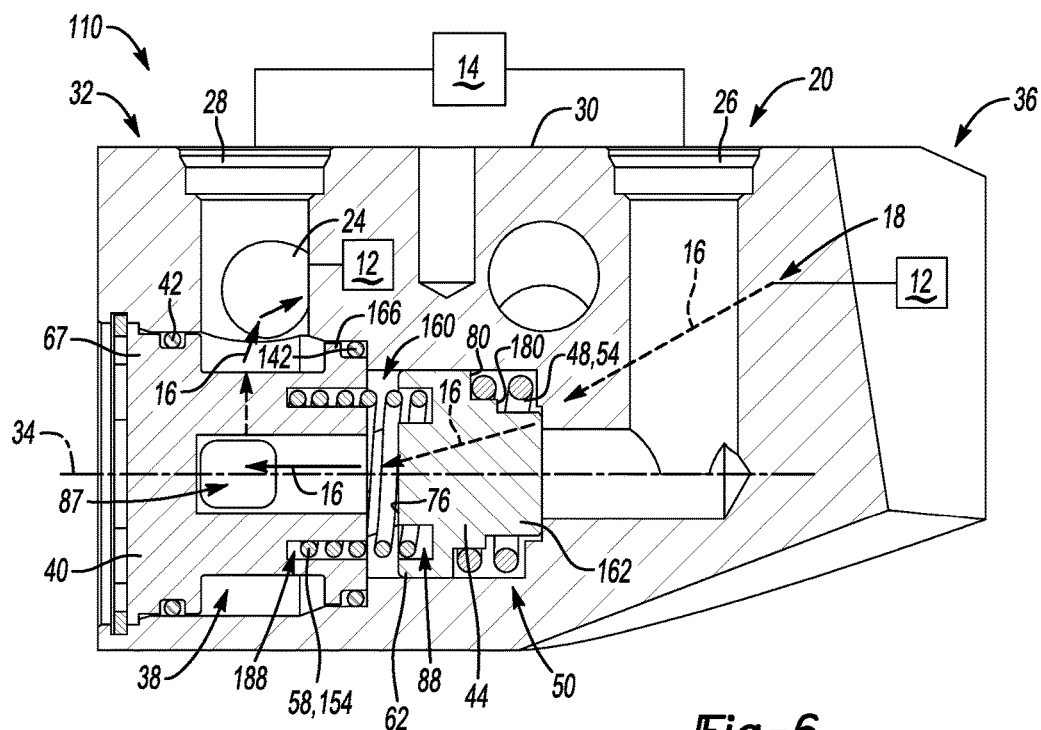
FIG. 6 is a schematic illustration of a cross-sectional view of the thermal bypass valve of FIG. 5 in which a shuttle is disposed in a bypass position.
Figure 7:
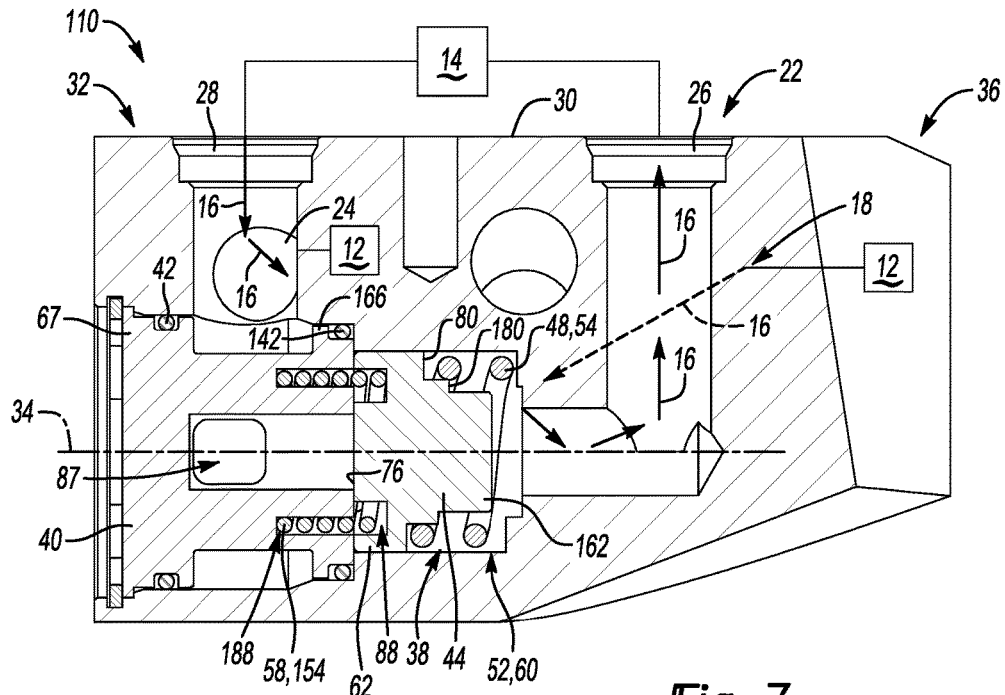
FIG. 7 is a schematic illustration of a cross-sectional view of the thermal bypass valve of FIG. 5 in which the shuttle is disposed in a cooling position.

Conversely, as shown in FIGS. 3 and 6, after the thermal bypass valve 10, 110 is in operation, the actuator 48 may seat against and abut the first step 80 as the shuttle 44 is disposed in and translates between the cooling position 22 (FIG. 3) and the bypass position 20 (FIG. 6). That is, the first compression coil spring 54 may "pop out" away from the longitudinal axis 34 towards the housing 30 within the bore 38 to re-seat onto the first step 80 for operation of the thermal bypass valve 10.

Referring again to FIG. 3, the housing 30 also defines a shoulder 86 that is aligned with the first end 62 of the shuttle 44 when the shuttle 44 is disposed in the cooling position 22. The second elastomeric seal 142 of the cap 40 may abut and compress against the shoulder 86. Therefore, the cap 40 may be comparatively shortened and a groove 84 defined by the cap 40 for the second elastomeric seal 142 may have a single side such that the second elastomeric seal 142 may be constrained against and seal with the shoulder 86.

During operation of the thermal bypass valve 10, as described with reference to FIG. 5, the first end 62 of the shuttle 44 may be spaced apart from the cap 40 and the second end 162 of the shuttle may be spaced apart from the housing 30 when the shuttle 44 is disposed in the first fill position 46 so that the fluid 16 flows to the cooler 14 and to the device 12. In addition, referring to FIG. 6, the second end 162 may seal against the housing 30 and the first end 62 may be spaced apart from the cap 40 when the shuttle 44 is disposed in the bypass position 20 so that the fluid 16 does not flow to the cooler 14. Also, referring to FIG. 7, the first end 62 may seal against the cap 40 and the second end 162 may be spaced apart from the housing 30 when the shuttle 44 is disposed in the cooling position 22 so that the fluid 16 flows to the cooler 14.

Next referring to the second embodiment of the thermal bypass valve 110 as described with reference to FIGS. 5-7, the cap 40 may further define a conduit 87 therein along the longitudinal axis 34 that is configured for transmitting the fluid 16 from the first inlet port 18 to the second outlet port 24 when the shuttle 44 is disposed in one of the first fill position 46 and the bypass position 20. That is, the conduit 87 may be internal to the cap 40. In addition, for this embodiment, the shuttle 44 may define a first channel 88 therein that is coaxial with and surrounds the conduit 87. Similarly, the cap 40 may define a second channel 188 therein along the longitudinal axis 34. Further, the bias resilient member 58 may be disposed within the first channel 88 and the second channel 188 and may extend from the first end 62 of the shuttle 44 and the fourth end 166 of the cap 40. As can be seen by comparing the bias resilient member 58 of FIG. 5 to the bias resilient member 58 of FIG. 3, the bias resilient member 58 of FIG. 5 may be larger and may consequently allow for a comparatively smaller sealing surface 76 and a comparatively small conduit 87 for fluid flow.

Next referring to the third embodiment of the thermal bypass valve 210 as described with reference to FIGS. 8 and 9, the thermal bypass valve 210 may include an alignment pin 93 attached to the cap 40 and disposed within the shuttle 44. The alignment pin 93 may be configured to align the shuttle 44 within the bore 38 as the shuttle 44 translates along the longitudinal axis 34. That is, rather than the housing 30 aligning the shuttle 44 as in the first and second embodiments of the thermal bypass valve 10, 110, for this embodiment, the shuttle 44 may be aligned within the bore 38 by the alignment pin 93. The shuttle 44 may also be disposed within the bore 38 between the cap 40 and the non-capped end 36.

In addition, for this embodiment, the shuttle 44 may have a flange 94 disposed between the first end 62 and the second end 162. The bias resilient member 58 may be coiled about the shuttle 44 at the second end 162 and be disposed between the flange 94 and the housing 30 within the bore. In addition, the actuator 48 may be coiled about the shuttle 44 and disposed between the flange 94 and the cap 40 at the first end 62.

Figure 9:
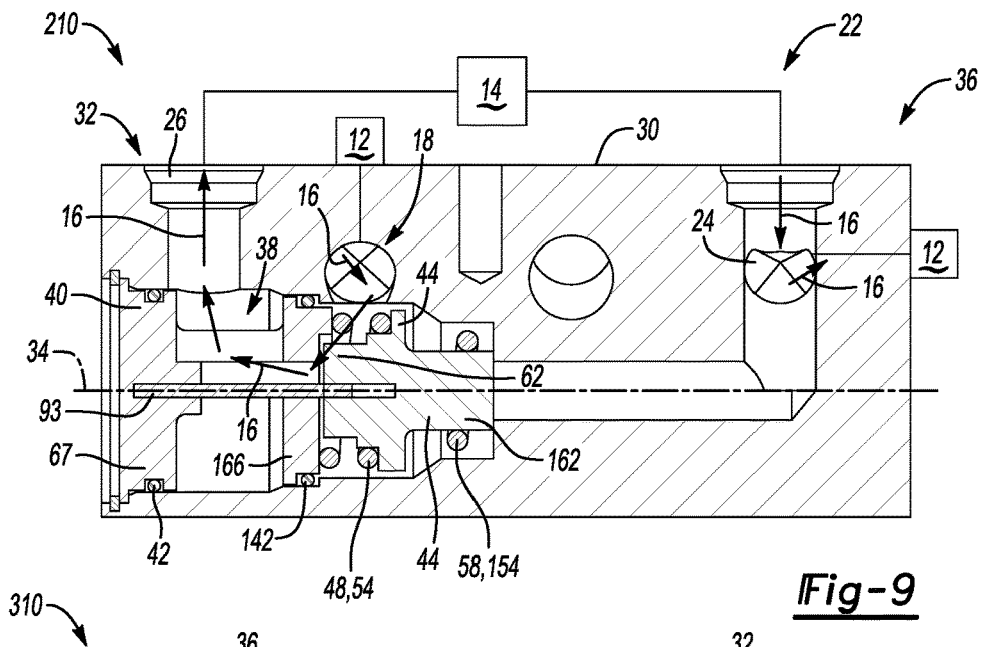
FIG. 9 is a schematic illustration of a cross-sectional view of the thermal bypass valve of FIG. 8 in which the shuttle is disposed in the cooling position.

As such, referring to FIG. 9, the second end 162 may seal against the housing 30 and the first end 62 may be spaced apart from the cap 40 when the shuttle 44 is disposed in the cooling position 22 so that the fluid 16 flows to the cooler 14. Conversely, referring to FIG. 8, the first end 62 may seal against the cap 40 and the second end 162 may be spaced apart from the housing 30 when the shuttle 44 is disposed in the bypass position 20 so that the fluid 16 does not flow to the cooler 14. Moreover, although not shown, the first end 62 may be spaced apart from the cap 40 and the second end 162 may be spaced apart from the housing 30 when the shuttle 44 is disposed in the first fill position 46 so that the fluid 16 flows to the cooler 14.

Figure 10:
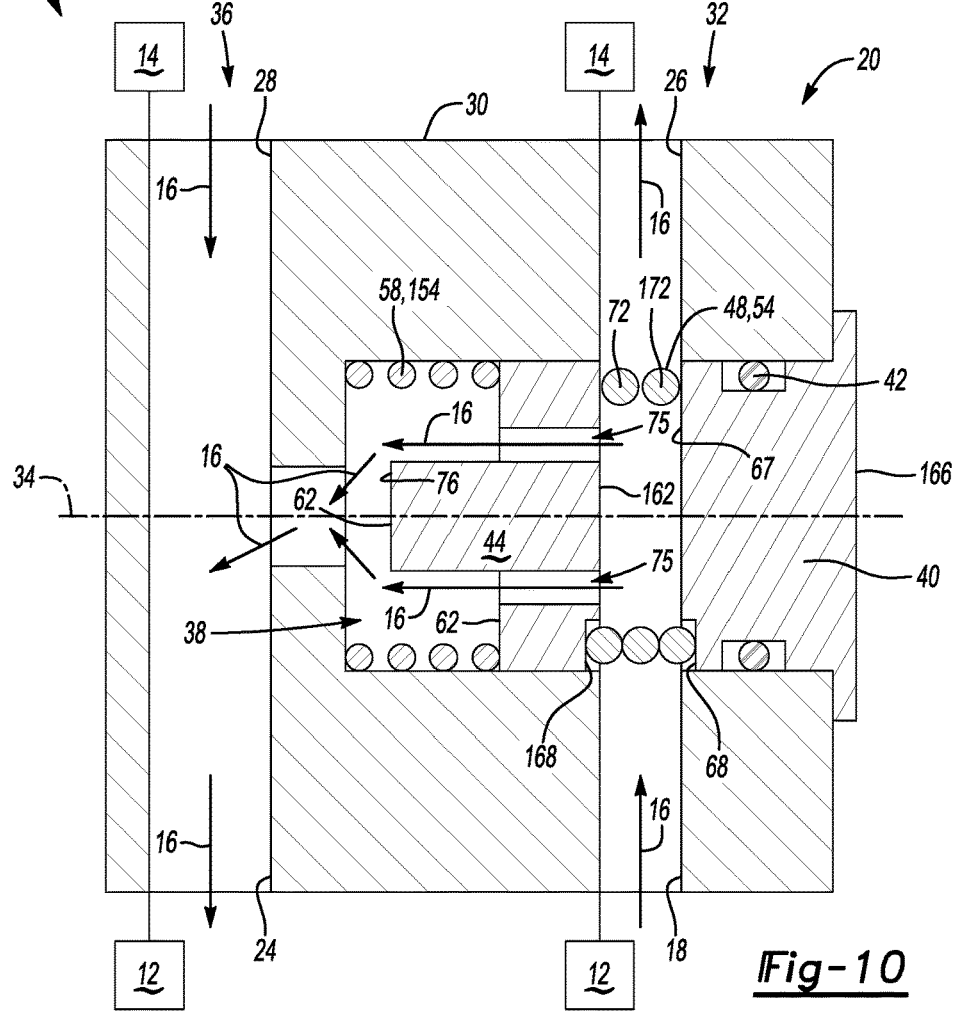
FIG. 10 is a schematic illustration of a cross-sectional view of a fourth embodiment of the thermal bypass valve of FIG. 1 in which the shuttle is disposed in the bypass position.

Referring now to the fourth embodiment of the thermal bypass valve 310 as described with reference to FIGS. 10 and 11, for this embodiment, the fourth outlet port 26 is continuously disposable in fluid communication with the first inlet port 18, i.e., when the shuttle 44 is disposed in the cooling position 22 (FIG. 11) and when the shuttle 44 is disposed in the bypass position 20 (FIG. 10). That is, this embodiment of the thermal bypass valve 310 allows for some fluid 16 to leak or flow to the cooler 14 even when the shuttle 44 is disposed in the bypass position 20 (FIG. 10). Such functionality may be useful for applications that require a permanent flow of fluid 16 to the cooler 14.

More specifically, for this embodiment, the shuttle 44 is reversibly translatable towards and away from the cap 40 along the longitudinal axis 34 between the cooling position 22 and the bypass position 20. For the cooling position 22, the first inlet port 18 is disposed in fluid communication with the fourth outlet port 26, and the third inlet port 28 is disposed in fluid communication with the second outlet port 24. For the bypass position 20, the first inlet port 18 is disposed in fluid communication with the second outlet port 24 and the fourth outlet port 26.

For this embodiment, the shuttle 44 may define a slot 75 or a plurality of holes (not shown) through the shuttle 44 at the second end 162 that is configured for transmitting the fluid 16 through the shuttle 44. The bias resilient member 58 may abut the shuttle 44 at the first end 62 and may abut the housing 30. Generally, the bias resilient member 58 of this embodiment may be comparatively larger than the bias resilient member 58 of the first embodiment. That is, as can be seen by comparing the bias resilient member 58 of FIG. 10 to the bias resilient member 58 of FIG. 3, the bias resilient member 58 of FIG. 10 may be larger and may consequently allow for a comparatively smaller sealing surface 76.

Further, the actuator 48 may abut the second end 162 and the third end 67 and may be disposed between the first inlet port 18 and the fourth outlet port 26.

Further, the cap 40 may also include an inclined plane or first ramp 68 and the shuttle 44 may include a second ramp 168 that is matable with the first ramp 68. The actuator 48 may include the top end 72 that abuts the second ramp 168 and a bottom end 172 that abuts the first ramp 68. In addition, the cap 40 may include solely the first elastomeric seal 42 that abuts and is compressed against the housing 30 within the bore 38.

Figure 11:
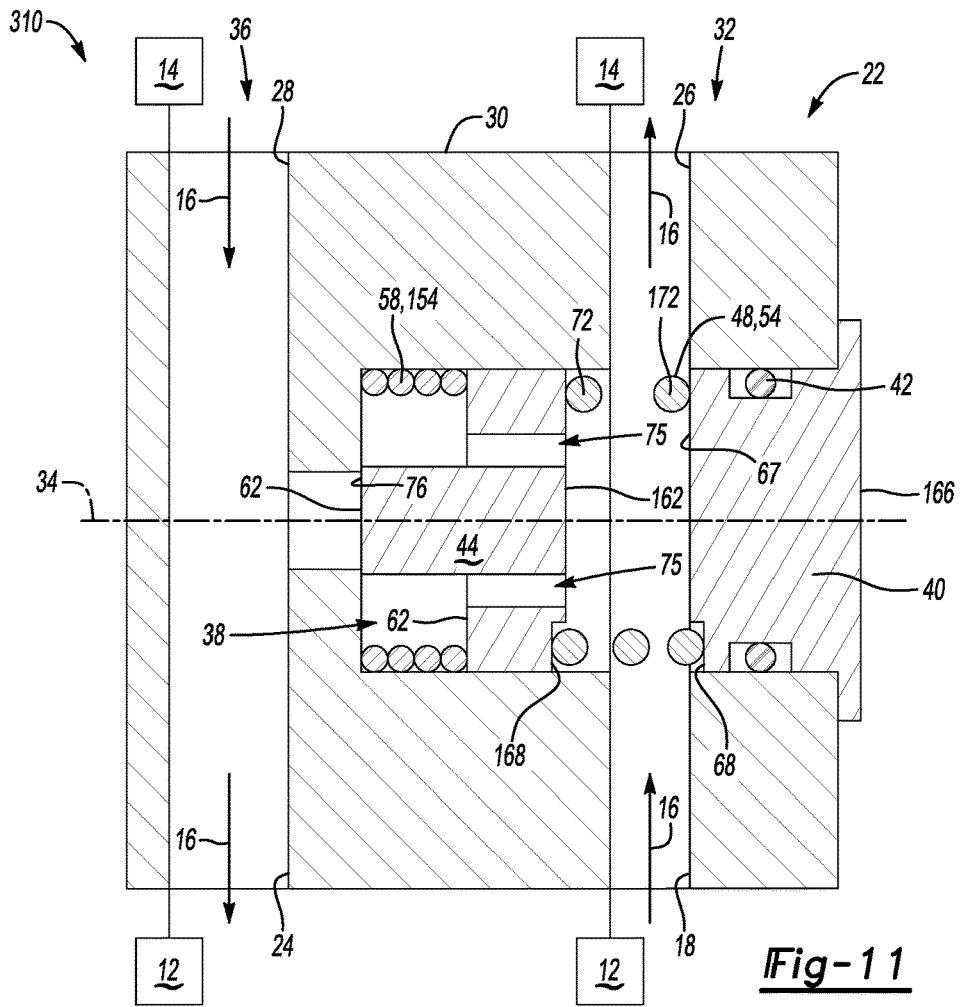
FIG. 11 is a schematic illustration of a cross-sectional view of the thermal bypass valve of FIG. 10 in which the shuttle is disposed in the cooling position.

Therefore, referring to FIG. 11, in operation, the first end 62 of the shuttle 44 may seal against the housing 30, the second end 162 of the shuttle 44 may be spaced apart from the cap 40, and the actuator 48 may decompress along the longitudinal axis 34 when the shuttle 44 is disposed in the cooling position 22 so that the fluid 16 flows to the cooler 14 and does not flow to the second outlet port 24. Conversely, referring to FIG. 10, the first end 62 may be spaced apart from the housing 30, the second end 162 may be spaced apart from the cap 40, and the actuator 48 may compress along the longitudinal axis 34 when the shuttle 44 is disposed in the bypass position 20 so that the fluid 16 flows to the cooler 14 and to the second outlet port 24. For this embodiment, the shuttle 44 may not be disposed in the first fill position 46 since at least a portion of the fluid 16 may flow through the cooler 14 even when the shuttle 44 is disposed in the bypass position 20.

Referring now to a method of selectively cooling the fluid 16, the method includes exposing the fluid 16 to the actuator 48 formed from the shape memory alloy. Concurrent to exposing, the method includes translating the shuttle 44 along the longitudinal axis 34 with respect to the cap 40 from the bypass position 20 to the cooling position 22 to thereby cool the fluid 16. After exposing, the method includes cooling the shape memory alloy so that the shape memory alloy transitions from the second state 52 (FIG. 7) to the first state 50 (FIG. 6). Concurrent to cooling, the method includes compressing the actuator 48 to thereby pull the shuttle 44 from the cooling position 22 to the bypass position 20 and thereby reset the thermal bypass valve 10, 110, 210, 310, 410, 510.

The method may further include, concurrent to cooling, sealing off the first inlet port 18 from the fourth outlet port 26 so that the first inlet port 18 and the fourth outlet port 26 are not disposed in fluid communication. Conversely, the method may further include, concurrent to exposing, disposing the first inlet port 18 in fluid communication with the fourth outlet port 26 and disposing the third inlet port 28 in communication with the second outlet port 24.

Figure 12:
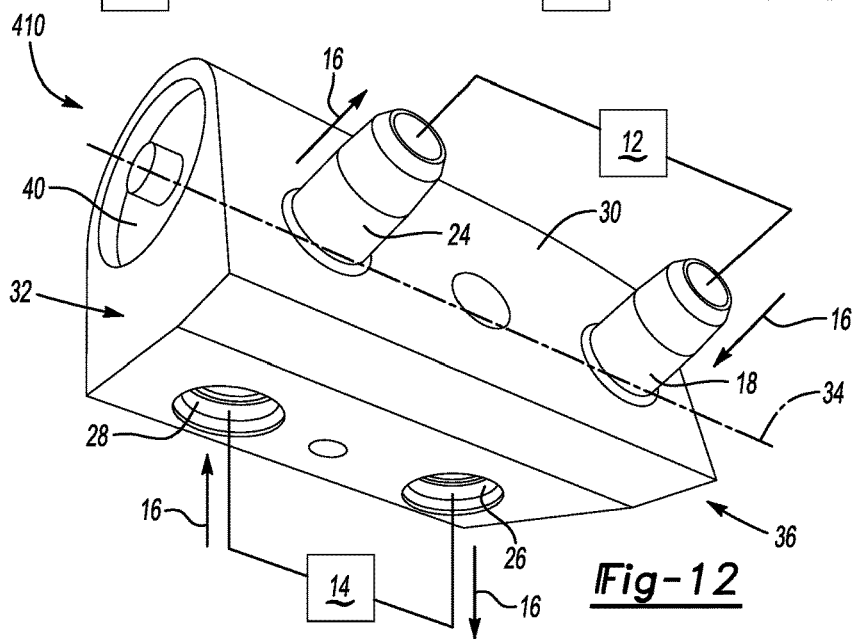
FIG. 12 is a schematic illustration of a perspective view of a fifth embodiment of the thermal bypass valve.
Figure 13:
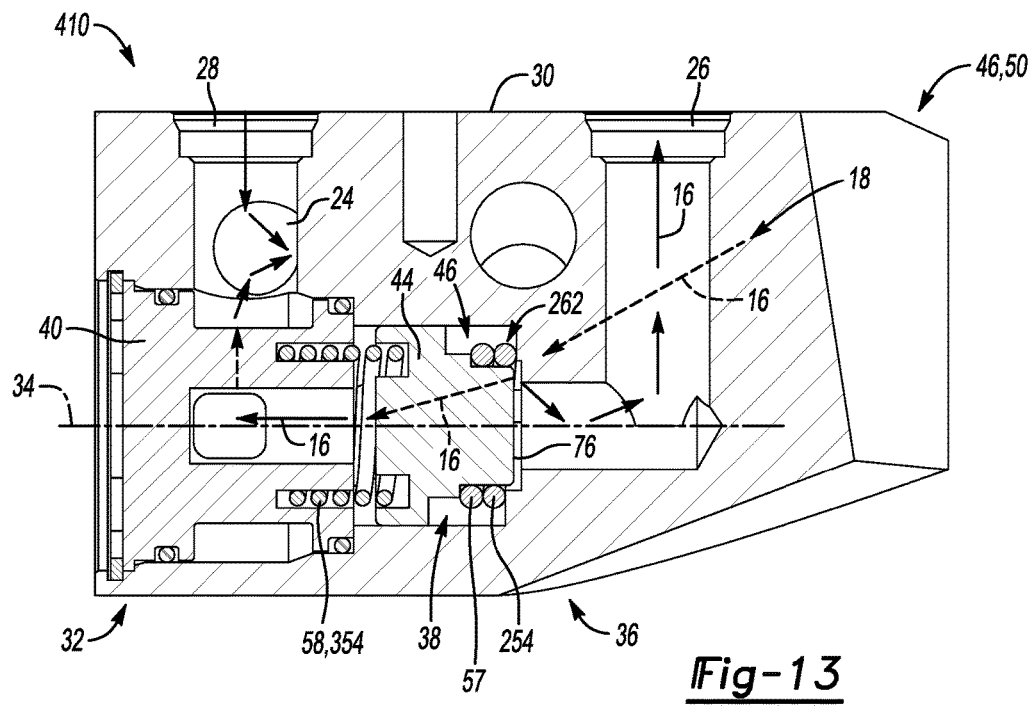
FIG. 13 is a schematic illustration of a cross-sectional view of the thermal bypass valve of FIG. 12 in which a shuttle is disposed in a first fill position.

Another fifth embodiment of the thermal bypass valve 410 is shown generally in FIG. 12. Further, the thermal bypass valve 410 provides leak-checking capability during initial assembly and attachment to the device 12.

Although described in greater detail below, the device 12 and the cooler 14 are each in fluid communication with the thermal bypass valve 410 and the cooler 14 is configured to cool the fluid 16 received therein. During operation, as best described with reference to FIG. 12, the fluid 16 is exhausted from the device 12 through the first inlet port 18 and enters the thermal bypass valve 410 through the first inlet port 18. The thermal bypass valve 410 is configured to move between at least the first fill position 46 (FIG. 13) and the bypass position 20 (FIG. 14) as a function of a temperature of the fluid 16, as set forth in more detail below. Referring specifically to FIG. 12, when the temperature of the fluid 16 is less than or equal to a threshold temperature, the fluid 16 does not require cooling and the thermal bypass valve 410 is disposed in the bypass position 20. When the thermal bypass valve 410 is in the bypass position 20, the fluid 16 is exhausted from the thermal bypass valve 410 through the second outlet port 24 and enters the device 12, thus bypassing the cooler 14. However, when the temperature of the fluid 16 is greater than the threshold temperature, the fluid 16 requires cooling to a lower temperature and the thermal bypass valve 410 may operate in the cooling position (not shown). When the thermal bypass valve 410 is disposed in the cooling position, the fluid 16 is exhausted from the thermal bypass valve 410 through the fourth outlet port 26 and enters the cooler 14. The fluid 16 is then cooled inside the cooler 14 and the fluid 16 subsequently enters the thermal bypass valve 410 through the third inlet port 28. Finally, the fluid 16 is exhausted from the thermal bypass valve 410 through the second outlet port 24 and transmitted to the device 12. Therefore, by directing the fluid 16 to the cooler 14 solely when the fluid 16 is greater than the threshold temperature, the cooler 14 operates selectively, which results in energy savings by preventing unnecessary operation of the cooler 14 at temperatures less than or equal to the threshold temperature. Advantageously, it is not required that the thermal bypass valve 410 is disposed in the bypass position 20 during initial assembly and attachment to the device 12. Rather, the thermal bypass valve 410 may operate in the first fill position 46 before initial heat up of the fluid 16. However, after the initial heat up of the fluid 16, the thermal bypass valve 410 may transition solely between the bypass position 20 and the cooling position 22.

In addition, although described in more detail below, the thermal bypass valve 410 may be disposed in the first fill position 46 during initial attachment of the thermal bypass valve 410 to the device 12. That is, the first fill position 46 may be useful for checking the thermal bypass valve 410 and the device 12 for leaks. The thermal bypass valve 410 may be disposed in the cooling position when the temperature of the fluid 16 exceeds the threshold temperature.

Referring now to FIG. 12, the thermal bypass valve 410 includes the housing 30 having a proximal end 32, e.g., the capped end 32; the longitudinal axis 34; and a distal end 36, e.g., the non-capped end 36, spaced apart from the proximal end 32 along the longitudinal axis 34.

As shown in FIGS. 2 and 3, the housing 30 defines the bore 38 extending along the longitudinal axis 34 and the first inlet port 18 is disposed in fluid communication with the bore 38. The bore 38 is configured for receiving and expelling the fluid 16. For applications in which the thermal bypass valve 410 is mounted to a transmission for a vehicle, the first inlet port 18 may be configured for conveying the fluid 16, e.g., a transmission fluid, from the device 12, i.e., the transmission, to the bore 38. Therefore, the first inlet port 18 may be characterized as a "from the device 12" inlet port.

The housing 30 also defines the second outlet port 24 disposed in fluid communication with the bore 38 and selectively disposable in fluid communication with the first inlet port 18. For example, the second outlet port 24 may be configured for removing the fluid 16 from the housing 30. For the transmission application described above, the second outlet port 24 may be configured for transmitting the fluid 16 from the bore 38 to the transmission. That is, the second outlet port 24 may be characterized as a "to the device 12" outlet port.

Further, as described in more detail below, during certain operating conditions, e.g., when the temperature of the fluid 16 is comparatively cool, the thermal bypass valve 410 may convey fluid directly from the first inlet port 18 to the second outlet port 24. However, during other operating conditions, e.g., when the temperature of the fluid 16 is comparatively warm, the thermal bypass valve 410 may direct the fluid 16 to the cooler 14 such that the first inlet port 18 is not disposed in direct fluid communication with the second outlet port 24. As such, the second outlet port 24 may selectively convey the fluid 16.

Figure 14:
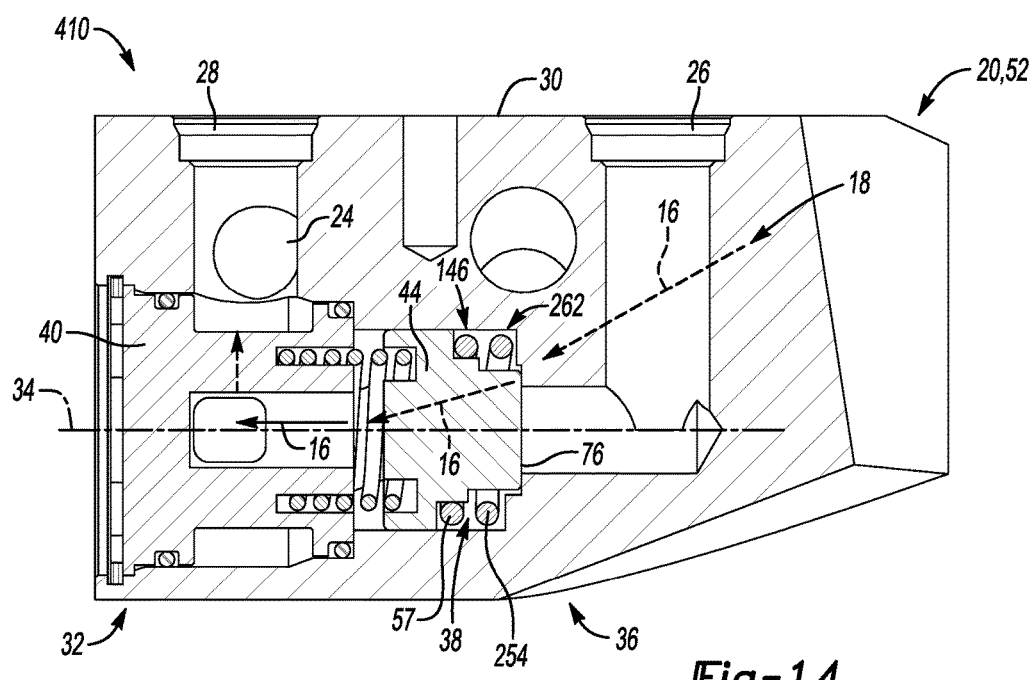
FIG. 14 is a schematic illustration of a cross-sectional view of the thermal bypass valve of FIG. 12 in which the shuttle is disposed in a bypass position.

As described with continued reference to FIG. 14, the housing 30 also defines the third inlet port 28 disposed in fluid communication with the bore 38 and selectively disposable in fluid communication with the second outlet port 24. For example, the third inlet port 28 may convey the fluid 16 from the cooler 14 to the bore 38. Therefore, during certain operating conditions, e.g., when the fluid 16 is relatively warm and is transmitted from the bore 38 to the cooler 14 for cooling, the third inlet port 28 may convey the cooled fluid back to the bore 38 from the cooler 14, and then on to the second outlet port 24. As such, the third inlet port 28 may be characterized as a "from the cooler 14" inlet port.

In addition, the housing 30 also defines the fourth outlet port 26 disposed in fluid communication with the bore 38 and the third inlet port 28. That is, the fourth outlet port 26 may convey the fluid 16 out of the housing 30 and to the cooler 14. The fourth outlet port 26 may also be selectively disposable in fluid communication with the first inlet port 18. For example, during certain operating conditions, e.g., when the temperature of the fluid 16 is comparatively warm, the thermal bypass valve 410 may direct the fluid 16 to the cooler 14 such that the fourth outlet port 26 is disposed in fluid communication with the first inlet port 18. Therefore, the fourth outlet port 26 may be characterized as a "to the cooler 14" outlet port.

As best shown in FIG. 12, the thermal bypass valve 410 may also include the cap 40 disposed within the bore 38 at the proximal end 32. The cap 40 may be removable from the housing 30 such that components of the thermal bypass valve 410 may be inserted into the housing 30 during assembly.

Referring now to FIG. 14, the thermal bypass valve 410 also includes the shuttle 44 disposed within the bore 38 and having a sealing surface 76 configured for mating with the housing 30 at the distal end 36. The sealing surface 76 seals off fluid flow within the bore 38 when the sealing surface 76 abuts and seals against the distal end 36 of the housing 30 so that the fluid 16 may not pass between the shuttle 44 and the housing 30 within the bore 38.

For instance, the shuttle 44 is reversibly translatable along the longitudinal axis 34 between:

the first fill position 46 (FIG. 13) in which the first inlet port 18 is disposed in fluid communication with both the second outlet port 24 and the fourth outlet port 26, the third inlet port 28 is disposed in fluid communication with the second outlet port 24, and the sealing surface 76 is spaced apart from the distal end 36; and the bypass position 20 (FIG. 14) in which the first inlet port 18 is disposed in fluid communication with the second outlet port 24, and the sealing surface 76 abuts and seals against the distal end 36.

More specifically, although described in more detail below, the shuttle 44 may be disposed in the first fill position 46 during initial attachment of the thermal bypass valve 410 to the device 12. That is, the first fill position 46 may be useful for checking the thermal bypass valve 410 and the device 12 for leaks before an initial use. While the shuttle 44 is disposed in the first fill position 46, the sealing surface 76 is spaced apart from and does not seal against the housing 30 such that the fluid 16 can pass between the shuttle 44 and the housing 30 within the bore 38. That is, the shuttle 44 and housing 30 define a gap therebetween when the shuttle 44 is disposed in the first fill position 46. Conversely, the thermal bypass valve 410 is disposed in the bypass position 20 when the temperature of the fluid 16 is less than or equal to the threshold temperature after initial assembly and installation of the thermal bypass valve 10. That is, when the thermal bypass valve 410 is disposed in the bypass position 20, the fluid 16 may not travel through the cooler 14 but may instead solely travel to and from the device 12, and the sealing surface 76 seals against the housing 30 such that the fluid 16 may not pass between the sealing surface 76 and the housing 30 within the bore 38. That is, the shuttle 44 and the housing 30 do not define a gap therebetween when the shuttle 44 is disposed in the bypass position 20.

In addition, as shown in FIGS. 13-23B, the thermal bypass valve 410 also includes a compression coil spring 254 configured for translating the shuttle 44 along the longitudinal axis 34 between the first fill position 46 and the bypass position 20. The compression coil spring 254 may have a helical shape and may compress and decompress along the longitudinal axis 34 to translate the shuttle 44. The compression coil spring 254 is formed from a shape memory alloy and is transitionable or translatable between the first state 50 (FIG. 13) and the second state 52 (FIG. 14) in response to the temperature of the fluid 16. Therefore, as set forth in more detail below, the shape memory alloy transitions between the first state 50 and the second state 52 to translate the shuttle 44 from the first fill position 46 to the bypass position 20.

Therefore, the shape memory alloy is configured as the compression coil spring 254 that decompresses and increases in pitch along the longitudinal axis 34 in response to an increase in the temperature of the fluid 16 to thereby translate the shuttle 44 from the first fill position 46 to the bypass position 20. Further, the shape memory alloy is configured to be activated in response to the temperature of the fluid 16 in the bore 38 having at least a first temperature that is greater than the threshold temperature such that the actuation of the shape memory alloy activates the compression coil spring 254 and the compression coil spring 254 longitudinally extends in length. Likewise, the shape memory alloy is configured to be deactivated in response to the temperature of the fluid 16 in the bore 38 when the temperature of the fluid 16 is a second temperature that is less than or equal to the threshold temperature and the first temperature, such that the shape memory alloy deactivates and the compression coil spring 254 longitudinally retracts in length. As such, due to the increase in length of the compression coil spring 254 when activated, a spring force of the compression coil spring 254 during activation is greater than the spring force of the compression coil spring 254 when the compression coil spring 254 is deactivated.

The compression coil spring 254 formed from the shape memory alloy may be characterized by the first state 50 (FIG. 6), i.e., an as-formed state, when a temperature of the shape memory alloy is below the martensite finish temperature, $M_f$, or transformation temperature, $T_{trans}$, of the shape memory alloy. Likewise, the compression coil spring 254 formed from the shape memory alloy may also be characterized by the second state 52, i.e., a hot state, when the temperature of the shape memory alloy is above the austenite finish temperature, $A_f$, or transformation temperature, $T_{trans}$, of the shape memory alloy. In addition, although not shown, the device 12, cooler 14, and/or a system or fluid circuit (not shown) including the device 12 and/or cooler 14 may include a plurality of shape memory alloys and/or a plurality of compression coil springs 254. Further, the shape memory alloy may contact the fluid 16. That is, the compression coil spring 254 may be disposed in and/or surrounded by the fluid 16.

Figure 15A:
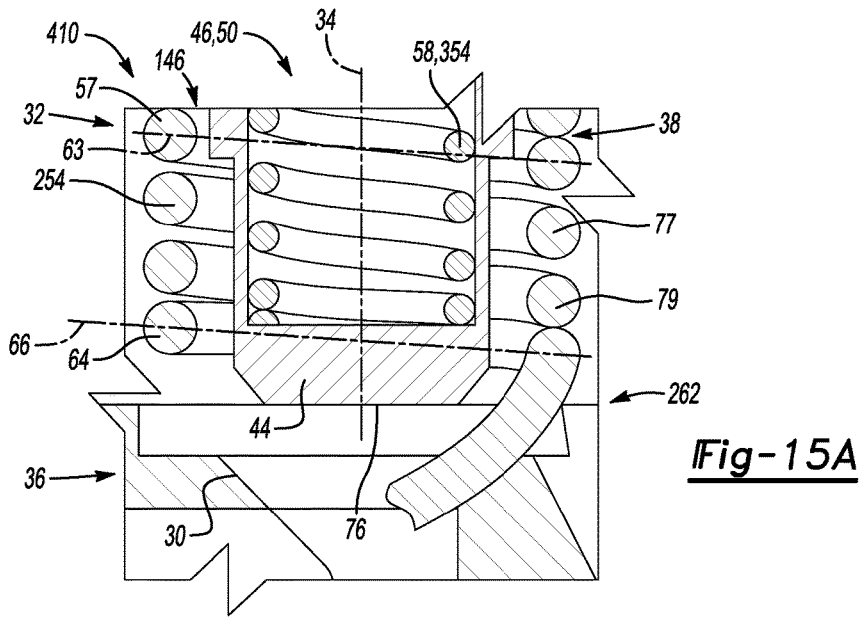
FIG. 15A is a schematic illustration of a cross-sectional view of a first embodiment of a compression coil spring, wherein the shuttle is disposed in the first fill position.
Figure 15B:
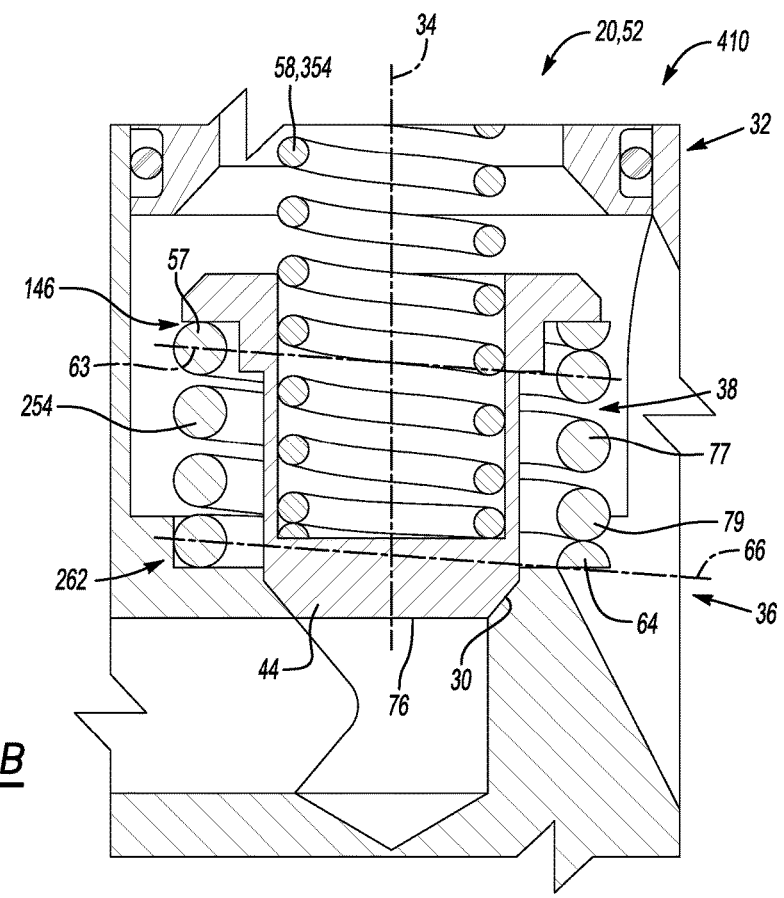
FIG. 15B is a schematic illustration of a cross-sectional view of the compression coil spring of FIG. 15A, wherein the shuttle is disposed in the bypass position.

Referring now to FIGS. 15A and 15B, the thermal bypass valve 410 may also include the bias resilient member 58 attached to the shuttle 44 and configured for biasing the shuttle 44 in the bypass position 20 as the shape memory alloy first heats up to transition from the first fill position 46 to the bypass position 20 and then is sufficiently cooled after the shuttle 44 has been disposed in the cooling position 22. That is, the bias resilient member 58 may reset the thermal bypass valve 410 after the temperature of the fluid 16 is once again less than or equal to the threshold temperature to thereby translate the shuttle from the cooling position 22 to the bypass position 20. That is, the bias resilient member 58 may return the shuttle 44 to the bypass position 20, i.e., may bias the shuttle 44 to the bypass position 20, when the temperature of the fluid 16 is less than or equal to the threshold temperature. As such, the bypass position 20 may be characterized as a starting or default position.

In particular, the compression coil spring 254 may have the first diameter 60 (FIG. 18) when the shuttle 44 is disposed in the cooling position 22, and the bias resilient member 58 may be configured as a second compression coil spring 354 that has the second diameter 160 (FIG. 18) that is less than the first diameter 60, and decompresses along the longitudinal axis 34 to translate the shuttle 44 from the cooling position 22 to the bypass position 20.

As shown in FIGS. 15A and 15B, the compression coil spring 254 may be coiled about the longitudinal axis 34 into a helix. Further, the compression coil spring 254 may have a primary end 146 and a secondary end 262 spaced apart from the primary end 146. The compression coil spring 254 also has a top coil 57 disposed in a first plane 63 and a bottom coil 64 spaced apart from the top coil 57 and disposed in a second plane 66 that is parallel to the first plane 63 and perpendicular to the longitudinal axis 34.

Referring now to FIG. 15A, in a first embodiment, the secondary end 262 may be bent such that the secondary end 262 is not parallel to the longitudinal axis 34, i.e., does not follow a helical trend, when the shuttle 44 is disposed in the first fill position 46, and the secondary end 262 may be disposed adjacent and in contact with the sealing surface 76 when the shuttle 44 is disposed in the first fill position 46. As such, the shape memory alloy at the secondary end 262 may prevent the sealing surface 76 from sealing against the housing 30 when the shuttle 44 is disposed in the first fill position 46. That is, the secondary end 262 may keep the sealing surface 76 pried open with respect to the distal end 36 of the housing 30.

However, referring to FIG. 15B, the secondary end 262 may not be bent and the secondary end 262 may be retracted into the bore 38 away from the housing 30 such that the secondary end 262 is disposed within the second plane 66 when the shuttle 44 is disposed in the bypass position 20. As such, the shape memory alloy at the secondary end 262 may not prevent the sealing surface 76 from sealing against the housing 30 when the shuttle 44 is disposed in the bypass position 20. That is, the secondary end 262 may retract away from the sealing surface 76 so that the shape memory alloy does not interfere with the sealing surface 76 sealing against the housing 30.

Referring now to FIGS. 16A and 16B, in a second embodiment, the bottom coil 64 may be non-circular and may be disposed between and abut the sealing surface 76 and the distal end 36 when the shuttle 44 is disposed in the first fill position 46. For example, the bottom coil 64 may have a U-shaped configuration as shown in FIG. 16A or may have a snake-like configuration as shown in FIG. 16B. The non-circular shape may rest against the sealing surface 76 to thereby prevent the sealing surface 76 from sealing against the housing 30 when the shuttle 44 is disposed in the first fill position 46. However, as the shape memory alloy heats up during initial use, the shape memory alloy may transition to the second state 52, assume a circular shape, and allow the sealing surface 76 to seat against the housing 30 when the shuttle 44 is disposed in the bypass position 20.

Referring now to FIG. 17, in a third embodiment, the secondary end 262 of the bottom coil 64 may be twisted out of the second plane 66 (FIG. 15A) and may be disposed between and abut the sealing surface 76 and the distal end 36 when the shuttle 44 is disposed in the first fill position 46. For example, the secondary end 262 may be bent both vertically and within or inside the second plane 66. The twisted-out-of-plane shape may cause the secondary end 262 to rest against the sealing surface 76 to thereby prevent the sealing surface 76 from sealing against the housing 30 when the shuttle 44 is disposed in the first fill position 46. However, as the shape memory alloy heats up during initial use, the shape memory alloy may assume a circular shape and allow the sealing surface 76 to seat against the housing 30 when the shuttle 44 is disposed in the bypass position 20.

Figure 18:
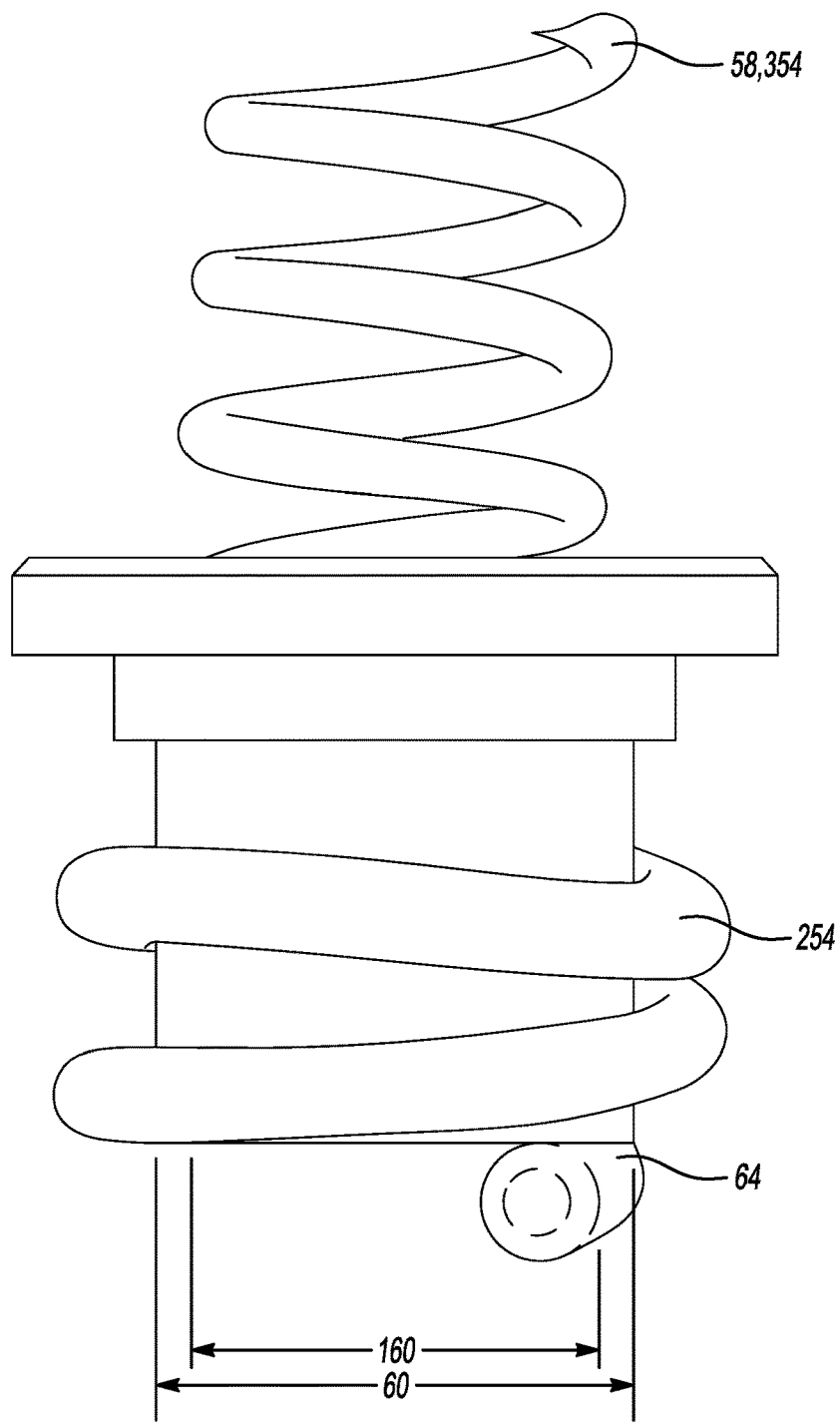
FIG. 18 is a schematic illustration of a perspective view of a fifth embodiment of the compression coil spring of FIG. 15A.

Referring now to FIG. 18, in a fourth embodiment, the shuttle 44 may have the first diameter 60 and the bottom coil 64 may have the second diameter 160 that is less than the first diameter 60. Further, the bottom coil 64 may abut the sealing surface 76 when the shuttle 44 is disposed in the first fill position 46. That is, interference from the secondary end 262 results in a non-sealing shuttle 44. Conversely, the bottom coil 64 may not abut the sealing surface 76 when the shuttle 44 is disposed in the bypass position 20.

Figure 19A:
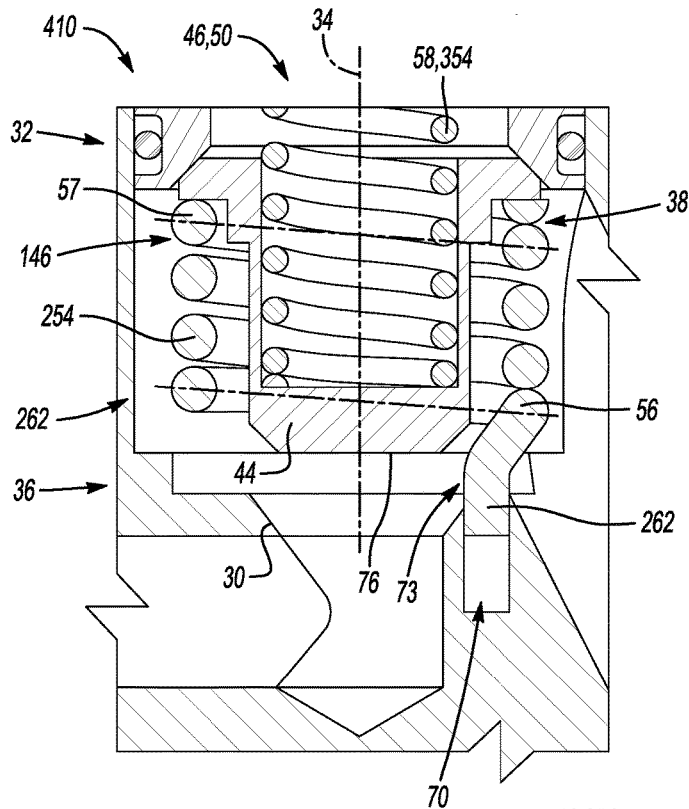
FIG. 19A is a schematic illustration of a cross-sectional view of a sixth embodiment of a compression coil spring of FIG. 15A, wherein the shuttle is disposed in the first fill position.
Figure 19B:
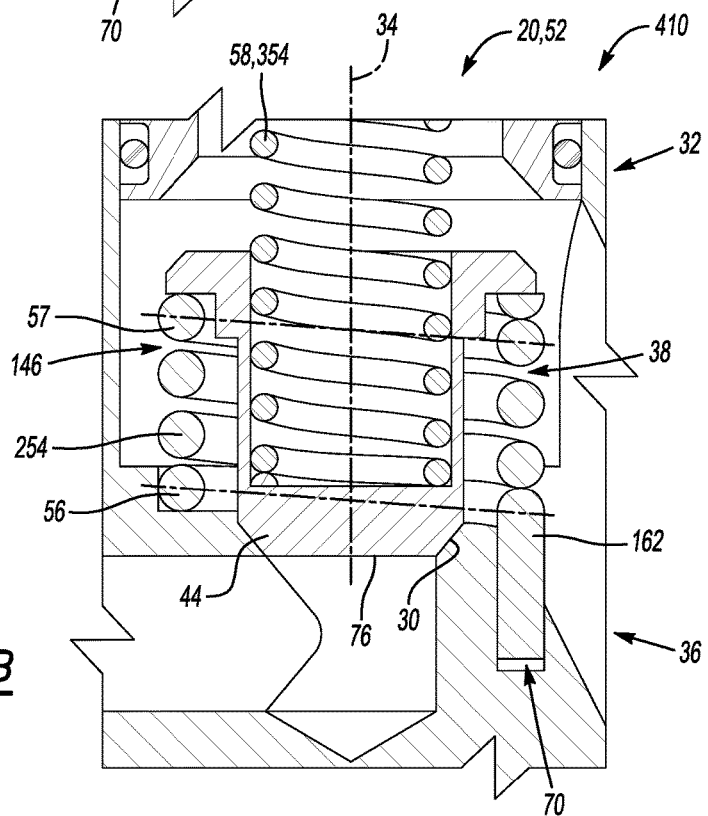
FIG. 19B is a schematic illustration of a cross-sectional view of the compression coil spring of FIG. 19A, wherein the shuttle is disposed in the bypass position.

Referring now to FIGS. 19A and 19B, in a fifth embodiment, the housing 30 may define a hole 70 therein at the distal end 36. Further, the secondary end 262 may be disposed in the hole 70. However, as shown in FIG. 19A, the secondary end 262 may include a crimp 73 or bend and may be partially disposed in the hole 70 when the shuttle 44 is disposed in the first fill position 46. As shown in FIG. 19B, the second end 162 may become straight and parallel to the longitudinal axis 34 after the temperature reaches the threshold temperature and may extend completely into the hole 70 when the shuttle is disposed in the bypass position 20 so that the sealing surface 76 can mate with the housing 30.

Figure 20:
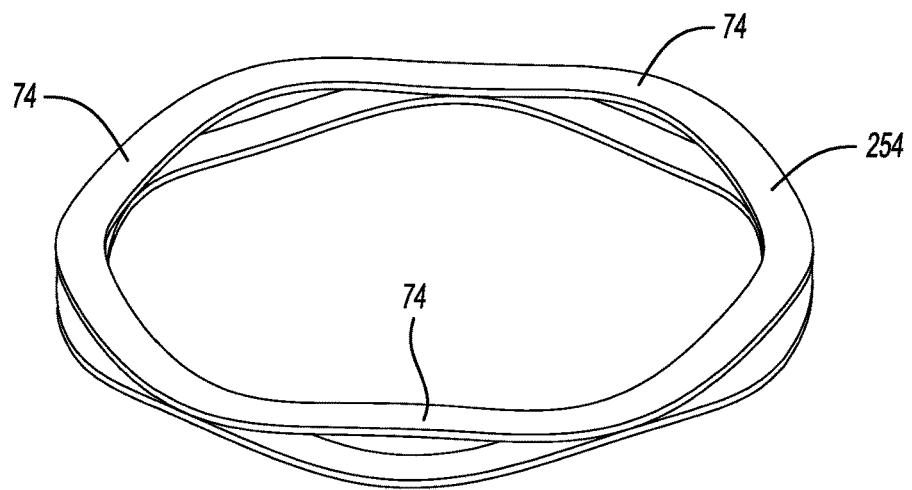
FIG. 20 is a schematic illustration of a perspective view of a seventh embodiment of the compression coil spring of FIG. 15A.

Referring now to FIG. 20, in a sixth embodiment, the bottom coil 64 may be corrugated such that a second plurality of portions 74 of the bottom coil 64 are disposed out of the second plane 66 (FIG. 15A) so that the bottom coil 64 partially abuts the sealing surface 76 when the shuttle 44 is disposed in the first fill position 46. That is, the bottom coil 64 may have a wavy configuration. However, the second plurality of portions 74 may be disposed within the second plane 66 when the shuttle 44 is disposed in the bypass position 20 so that the shuttle 44 may seal to the housing 30.

Further, although not shown, the thermal bypass valve 410 may include a third coil 77 (FIG. 15A) and a fourth coil 79 (FIG. 15A) disposed adjacent to the third coil 77 and the bottom coil 64. The third coil 77 and the fourth coil 79 may be corrugated and stacked upon each other such that a third plurality of portions of the third coil 77 abut a fourth plurality of portions of the fourth coil 79 when the shuttle 44 is disposed in the first fill position 46. As such, the compression coil spring 254 may have a first height when the shuttle 44 is disposed in the first fill position 46, and a second height that is less than the first height when the shuttle 44 is disposed in the bypass position 20. That is, as the shape memory alloy heats up from exposure to the fluid 16, each of the coils 64, 77, 79 may smooth out and the compression coil spring 254 may decrease in height from the first height to the second height.

Figure 21:
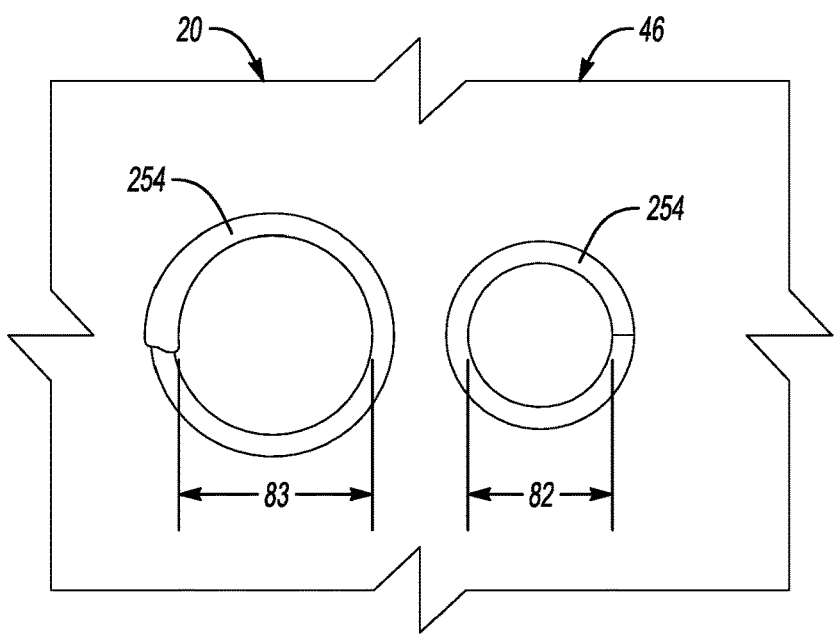
FIG. 21 is a schematic illustration of a perspective view of an eighth embodiment of the compression coil spring of FIG. 15A.

Referring now to FIG. 21, in a seventh embodiment, the compression coil spring 254 may have a first height and a first internal diameter 82 when the shuttle 44 is disposed in the first fill position 46, and a second height that is less than the first height and a second internal diameter 83 that is larger than the first internal diameter 82 when the shuttle 44 is disposed in the bypass position 20. That is, the shape memory alloy may be twisted to have a comparatively smaller internal diameter and a longer length in the as-formed state. However, once heated, the shape memory alloy may return to the standard internal diameter and standard height.

Figure 22:
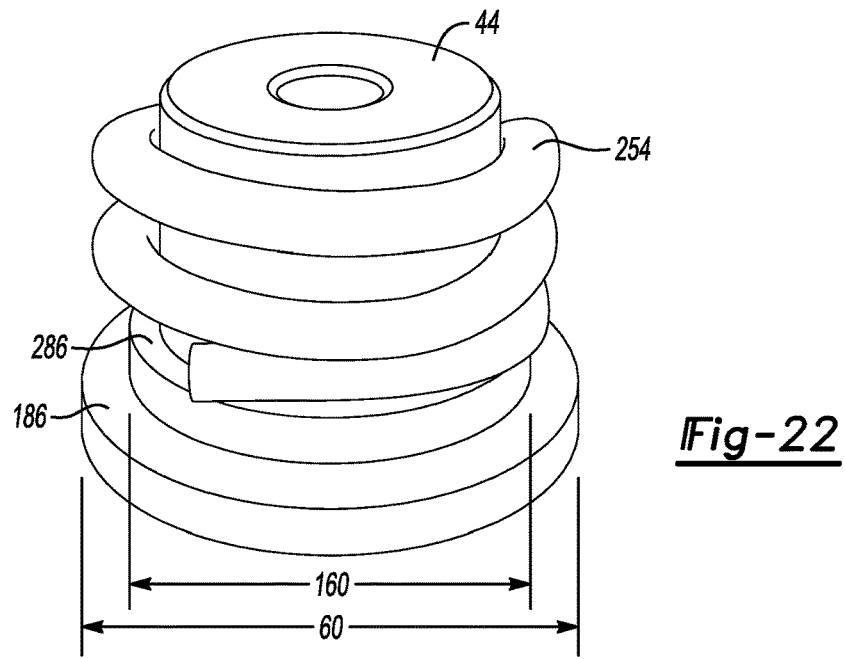
FIG. 22 is a schematic illustration of a perspective view of a ninth embodiment of the compression coil spring of FIG. 15A.

Referring now to FIG. 22, in an eighth embodiment, the shuttle 44 has a first shoulder 186 having the first diameter 60 and a second shoulder 286 having the second diameter 160 that is less than the first diameter 60. The bottom coil 64 may be disposed on the second shoulder 286 when the shuttle 44 is disposed in the first fill position 46, and may be disposed on the first shoulder 186 when the shuttle 44 is disposed in the bypass position 20. That is, before the shape memory alloy is twisted, the compression coil spring 254 may sit on the second shoulder 286 when the shuttle 44 is disposed in the first fill position 46. However, once heated, the compression coil spring 254 may sit on the first shoulder 186 when the shuttle 44 is disposed in the bypass position 20.

Figure 23A:
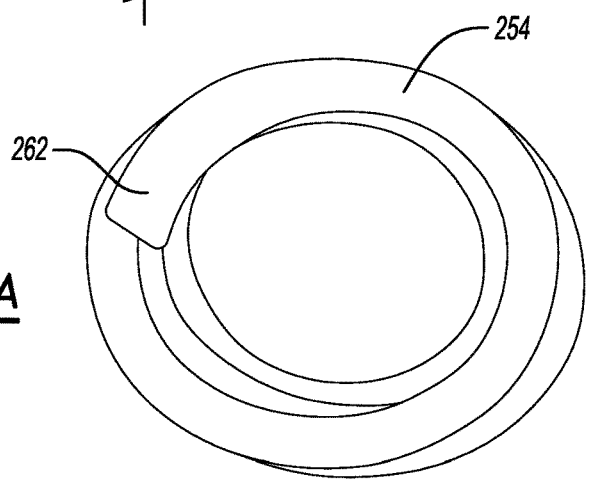
FIG. 23A is a schematic illustration of an end view of a tenth embodiment of the compression coil spring of FIG. 15A.
Figure 23B:
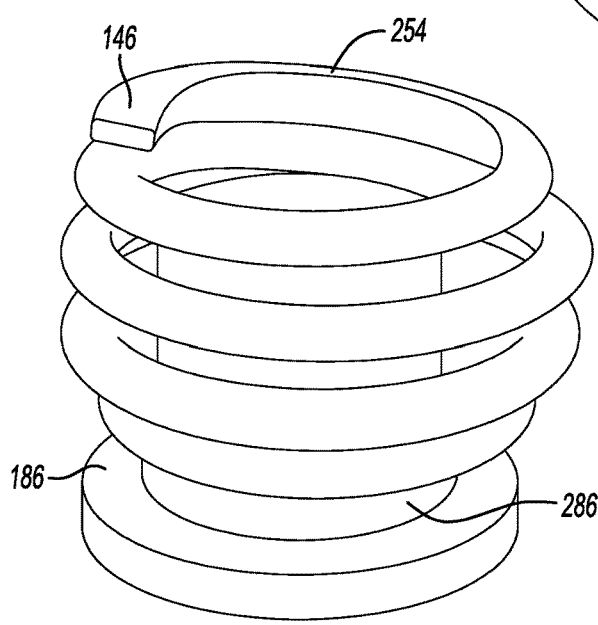
FIG. 23B is a schematic illustration of a perspective view of the compression coil of FIG. 23A.

Referring now to FIGS. 23A and 23B, in a ninth embodiment, the compression coil spring 254 may have an oval shape and may be disposed on the second shoulder 286 when the shuttle 44 is disposed in the first fill position 46, and the compression coil spring 254 may have a circular shape and be disposed on the first shoulder 186 when the shuttle 44 is disposed in the bypass position 20. That is, the compression coil spring 254 may be crushed into the oval shape so that the compression coil spring 254 may be supported by the second shoulder 286. It is to be appreciated that solely the bottom coil 64 may have the oval shape and may be disposed on the second shoulder 286 when the shuttle 44 is disposed in the first fill position 46. Conversely, the bottom coil 64 may then have the circular shape and may be disposed on the first shoulder 186 when the shuttle 44 is disposed in the bypass position 20.

Figure 24:
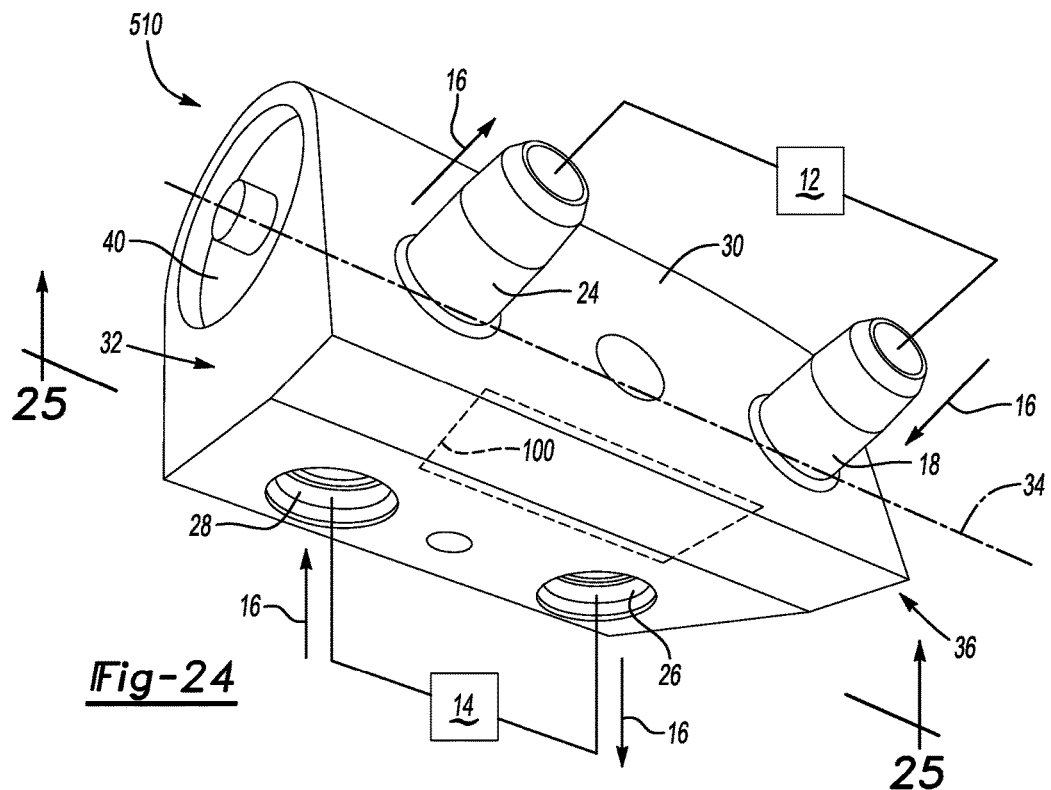
FIG. 24 is a schematic illustration of a perspective view of a valve that includes a shuttle alignment system.

A valve 510 including a shuttle alignment system 100 is shown generally in FIG. 24. The valve 510 and shuttle alignment system 100 may be useful for fluid circuits which include, for example, the device 12 and the cooler 14. As will be explained in more detail below, the valve 510 may be configured as a thermal bypass valve that selectively directs a flow of the fluid (shown generally by arrows 16 in FIG. 24) from the device 12 to the cooler 14. That is, the valve 510 may be configured for regulating or modulating a circulation of the fluid 16 between the device 12 and the cooler 14, and may function as a diverter valve.

Although described in greater detail below, the device 12 and the cooler 14 may each be in fluid communication with the valve 510 and the cooler 14 may be configured to cool the fluid 16 received therein. During operation, as best described with reference to FIG. 24, the fluid 16 may be exhausted from the device 12 through the first inlet port 18 and may enter the valve 510 through the first inlet port 18. The valve 510 may be configured to move between at least the first position 20, e.g., the bypass position, and the second position 22, e.g., the cooling position, as a function of a temperature of the fluid 16, as set forth in more detail below. Referring specifically to FIG. 24, when the temperature of the fluid 16 is less than or equal to a threshold temperature, the fluid 16 may not require cooling and the valve 510 may be disposed in the bypass position 20. When the valve 510 is in the bypass position 20, the fluid 16 may be exhausted from the valve 510 through the second outlet port 24 and enter the device 12, thus bypassing the cooler 14. However, when the temperature of the fluid 16 is greater than the threshold temperature, the fluid 16 may require cooling to a lower temperature and the valve 510 may operate in the cooling position 22. When the valve 510 is disposed in the cooling position 22, the fluid 16 may be exhausted from the valve 510 through the fourth outlet port 26 and may enter the cooler 14. The fluid 16 may then be cooled inside the cooler 14 and the fluid 16 may subsequently enter the valve 510 through the third inlet port 28. Finally, the fluid 16 may be exhausted from the valve 510 through the second outlet port 24 and transmitted to the device 12. Therefore, by directing the fluid 16 to the cooler 14 solely when the fluid 16 is greater than the threshold temperature, the cooler 14 may operate selectively, which results in energy savings by preventing unnecessary operation of the cooler 14 at temperatures less than or equal to the threshold temperature.

Referring now to FIG. 24, the shuttle alignment system 100 is configured for aligning components during operation of the valve 510, as set forth in more detail below. The shuttle alignment system 100 includes the housing 30 having the proximal end 32, the longitudinal axis 34, and the distal end 36 spaced apart from the proximal end 32 along the longitudinal axis 34. As best shown in FIG. 24, the distal end 36 may be truncated to reduce a weight of the valve 510. The proximal 32 may be generally configured for inserting components of the valve 510 into the housing 30.

As shown in FIGS. 25-28, the housing 30 defines the bore 38 extending along the longitudinal axis 34. The bore 38 is configured for receiving and expelling the fluid 16. For applications in which the valve 510 is mounted to a transmission for a vehicle, the first inlet port 18 may be configured for conveying the fluid 16, e.g., a transmission fluid, from the device 12, i.e., the transmission, to the bore 38.

Figure 25:
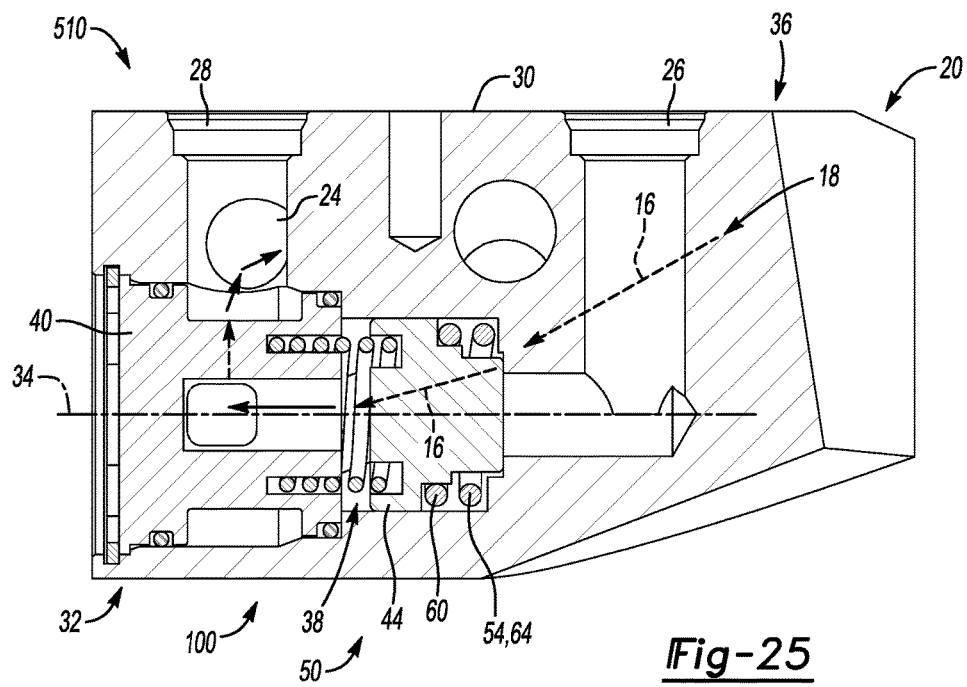
FIG. 25 is a schematic illustration of a cross-sectional view of the valve of FIG. 24 taken along section lines 25-25, wherein the shuttle alignment system has a shuttle disposed in a first position.
Figure 26:
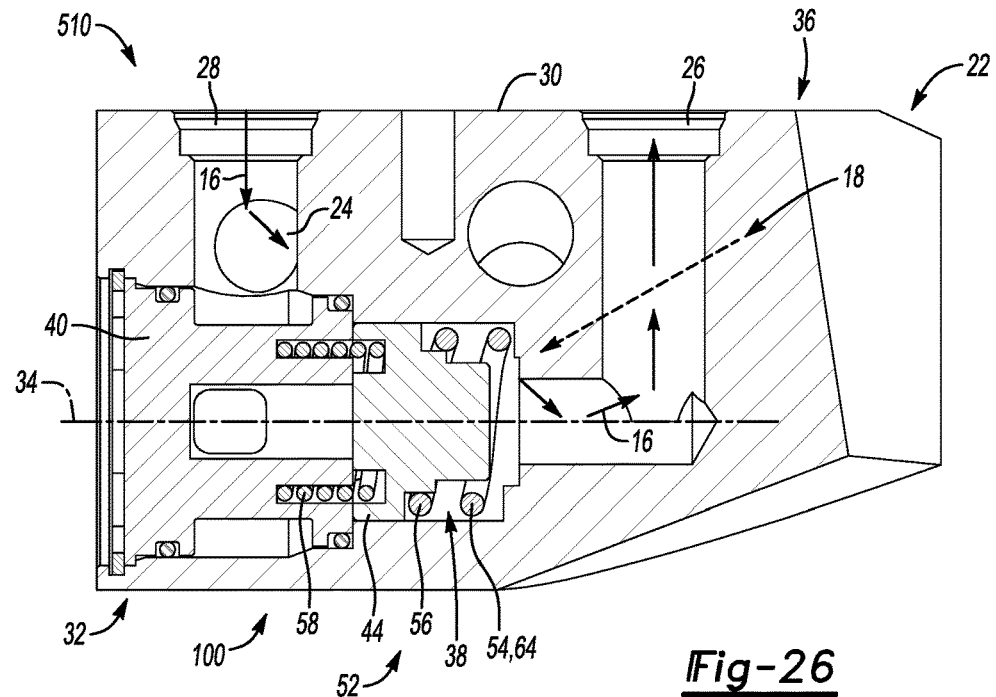
FIG. 26 is a schematic illustration of a cross-sectional view of the shuttle alignment system of FIG. 24, wherein the shuttle is disposed in a second position.

As best shown in FIGS. 24-26, the valve 510 may also include the cap 40 disposed within the bore 38 at the proximal end 32. The cap 40 may be removable from the housing 30 such that components of the shuttle alignment system 100 may be inserted into the housing 30 during assembly.

Figure 27:
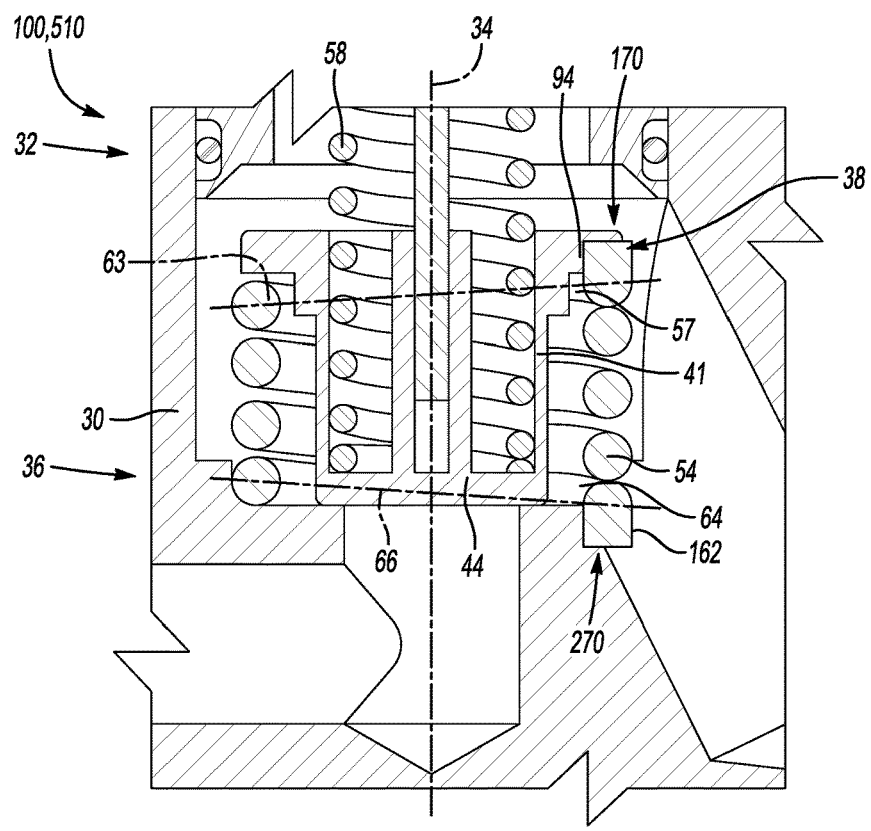
FIG. 27 is a schematic illustration of a cross-sectional view of a first embodiment of the shuttle alignment system of FIG. 24.

Referring now to FIGS. 25 and 26, the shuttle alignment system 100 also includes the shuttle 44 disposed within the bore 38 and reversibly translatable along the longitudinal axis 34 between the first position 20 in which the shuttle 44 is disposed at the distal end 36 and the second position 22 in which the shuttle 44 is disposed at the proximal end 32. As best shown in FIG. 27, the shuttle 44 also has a body 41 and the flange 94 that is perpendicular to the longitudinal axis 34 and extends from the body 41.

Although described in more detail below, the shuttle 44 may be disposed in the second position 22 when the temperature of the fluid 16 exceeds the threshold temperature. That is, when the shuttle 44 is disposed in the second position 22, the fluid 16 may travel through the cooler 14 before returning back to the device 12. Conversely, the shuttle 44 is disposed in the first position 20 when the temperature of the fluid 16 is less than or equal to the threshold temperature. That is, when the shuttle 44 is disposed in the first position 20, the fluid 16 may not travel through the cooler 14 but may instead solely travel to and from the device 12.

In addition, as shown in FIGS. 25-30, the shuttle alignment system 100 also includes a compression coil spring 54 attached to the shuttle 44 and the housing 30 and configured for translating the shuttle 44 along the longitudinal axis 34 between the first position 20 and the second position 22. That is, the compression coil spring 54 may have a helical shape and may compress and decompress along the longitudinal axis 34 to translate the shuttle 44. The coil compression spring 54 is formed from a shape memory alloy and is transitionable or translatable between the first state 50 (FIG. 25) and the second state 52 (FIG. 26) in response to the temperature of the fluid 16. Therefore, as set forth in more detail below, the shape memory alloy transitions between the first state 50 and the second state 52 to translate the shuttle 44 from the first position 20 to the second position 22.

Generally, the shape memory alloy may be selected according to desired operating temperatures of the device 12, cooler 14, shuttle alignment system 100, and valve 510. In one specific example, the shape memory alloy may include nickel and titanium.

Therefore, in one non-limiting example, the shape memory alloy may be configured as the compression coil spring 54 that decompresses and increases in pitch along the longitudinal axis 34 in response to an increase in the temperature of the fluid 16 to thereby translate the shuttle 44 from the first position 20 to the second position 22. That is, the shape memory alloy is configured to be activated in response to the temperature of the fluid 16 in the bore 38 having at least a first temperature that is greater than the threshold temperature such that the actuation of the shape memory alloy activates the compression coil spring 54 and the compression coil spring 54 longitudinally extends in length. Likewise, the shape memory alloy is configured to be deactivated in response to the temperature of the fluid 16 in the bore 38 when the temperature of the fluid 16 is a second temperature that is less than or equal to the threshold temperature and the first temperature, such that the shape memory alloy deactivates and the compression coil spring 54 longitudinally retracts in length. As such, due to the increase in length of the compression coil spring 54 when the compression coil spring 54 is activated, a spring force of the compression coil spring 54 is greater than the spring force of the compression coil spring 54 when the compression coil spring 54 is deactivated.

The compression coil spring 54 formed from the shape memory alloy may be characterized by the first state 50 (FIG. 25), i.e., when a temperature of the shape memory alloy is below the martensite finish temperature, $M_f$, or transformation temperature, $T_{trans}$, of the shape memory alloy. Likewise, the compression coil spring 54 formed from the shape memory alloy may also be characterized by the second state 52 (FIG. 26), i.e., when the temperature of the shape memory alloy is above the austenite finish temperature, $A_f$, or transformation temperature, $T_{trans}$, of the shape memory alloy. In addition, although not shown, the device 12, cooler 14, shuttle alignment system 100, valve 510, and/or a system or fluid circuit (not shown) including the device 12 and/or cooler 14 may include a plurality of shape memory alloys and/or a plurality of compression coil springs 54. Further, the shape memory alloy may contact the fluid 16. That is, the compression coil spring 54 may be disposed in and/or surrounded by the fluid 16.

Referring now to FIGS. 27-30, the shuttle alignment system 100 may also include the bias resilient member 58 attached to the shuttle 44 and configured for translating the shuttle 44 along the longitudinal axis 34 from the second position 22 to the first position 20 as the shape memory alloy cools. That is, the bias resilient member 58 may reset the valve 510 and shuttle alignment system 100 after the temperature of the fluid 16 is once again less than or equal to the threshold temperature to thereby translate the shuttle from the second position 22 to the first position 20. That is, the bias resilient member 58 may return the shuttle 44 to the first position 20, i.e., may bias the shuttle 44 to the first position 20, when the temperature of the fluid 16 is less than or equal to the threshold temperature. As such, the first position 20 may be characterized as a starting or default position.

The compression coil spring 54 may have the first end 62 and the second end 162 spaced apart from the first end 62. Further, the compression coil spring 54 may be coiled about the longitudinal axis 34 into a helical shape. The compression coil spring 54 may have the top coil 57 disposed in the first plane 63 and the bottom coil 64 spaced apart from the top coil 57 and disposed in the second plane 66 that is parallel to the first plane 63 and perpendicular to the longitudinal axis 34.

Referring now to FIG. 27, in a first embodiment of the shuttle alignment system 100, the flange 94 may define a first hole 170 therein and the housing 30 may define a second hole 270 therein. Further, the first end 62 may be bent such that the first end 62 is disposed perpendicular to the first plane 63 and parallel to the longitudinal axis 34, i.e., bent to vertical. Similarly, the second end 162 may be bent such that the second end 162 is disposed perpendicular to the second plane 66 and parallel to the longitudinal axis 34, i.e., bent to vertical. For this embodiment, the first end 62 may be disposed in the first hole 170 and the second end 162 may be disposed in the second hole 270. Alternatively, one of the first end 62 and the second end 162 may be disposed in the respective first hole 170 and second hole 270. As such, a comparatively small length of shape memory alloy may be used to form the compression coil spring 54, and the shuttle 44 and housing 30 may support and anchor the compression coil spring 54. In addition, although not shown, the first embodiment of the shuttle alignment system 100 may include a countersink to avoid creasing the shape memory alloy at a 90° bend.

Figure 28:
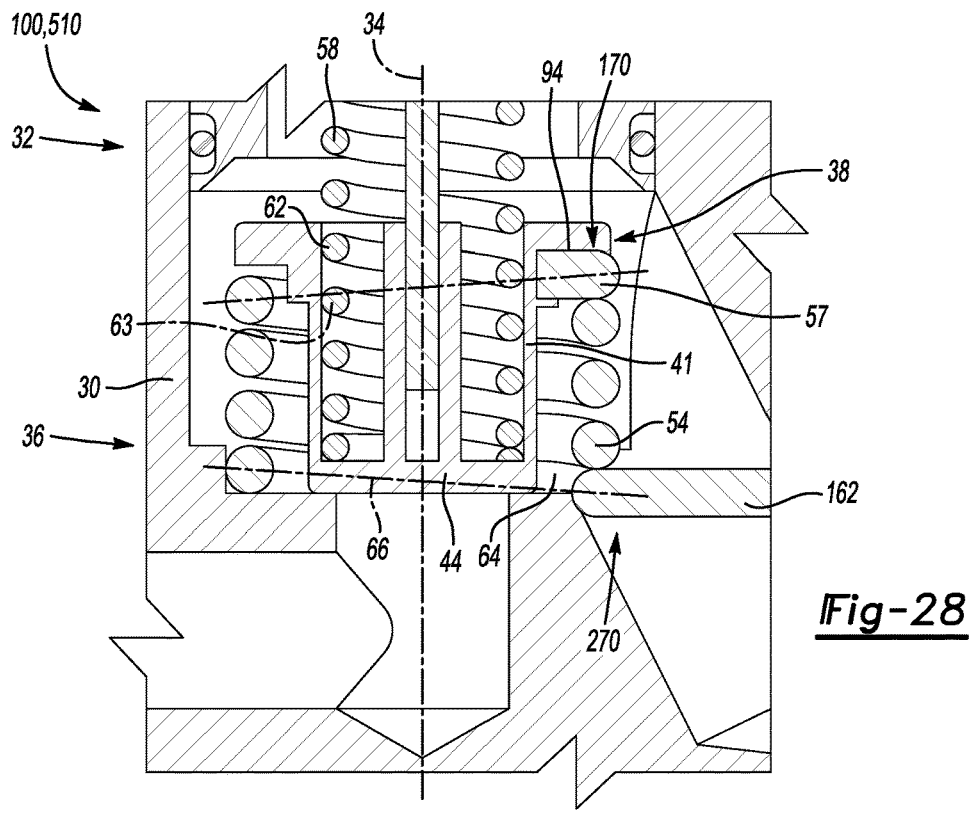
FIG. 28 is a schematic illustration of a cross-sectional view of a second embodiment of the shuttle alignment system of FIG. 24.

Referring now to FIG. 28, in a second embodiment of the shuttle alignment system 100, the body 41 or shuttle may define the first hole 170 therein and the housing 30 may define the second hole 270 therein. Further, the first end 62 may be bent such that the first end 62 is disposed within the first plane 63 and is perpendicular to the longitudinal axis 34, i.e., bent to horizontal. Similarly, the second end 162 may be bent such that the second end 162 is disposed within the second plane 66 and is perpendicular to the longitudinal axis 34, i.e., bent to horizontal. For this embodiment, the first end 62 may be disposed in the first hole 170 and the second end 162 may be disposed in the second hole 270. Alternatively, one of the first end 62 and the second end 162 may be disposed in the respective first hole 170 and second hole 270. As such, a comparatively small length of shape memory alloy may be used to form the compression coil spring 54, and the shuttle 44 and housing 30 may support and anchor the compression coil spring 54. In addition, although not shown, the second embodiment of the shuttle alignment system 100 may include a countersink to avoid creasing the shape memory alloy at a 90° bend.

Figure 29:
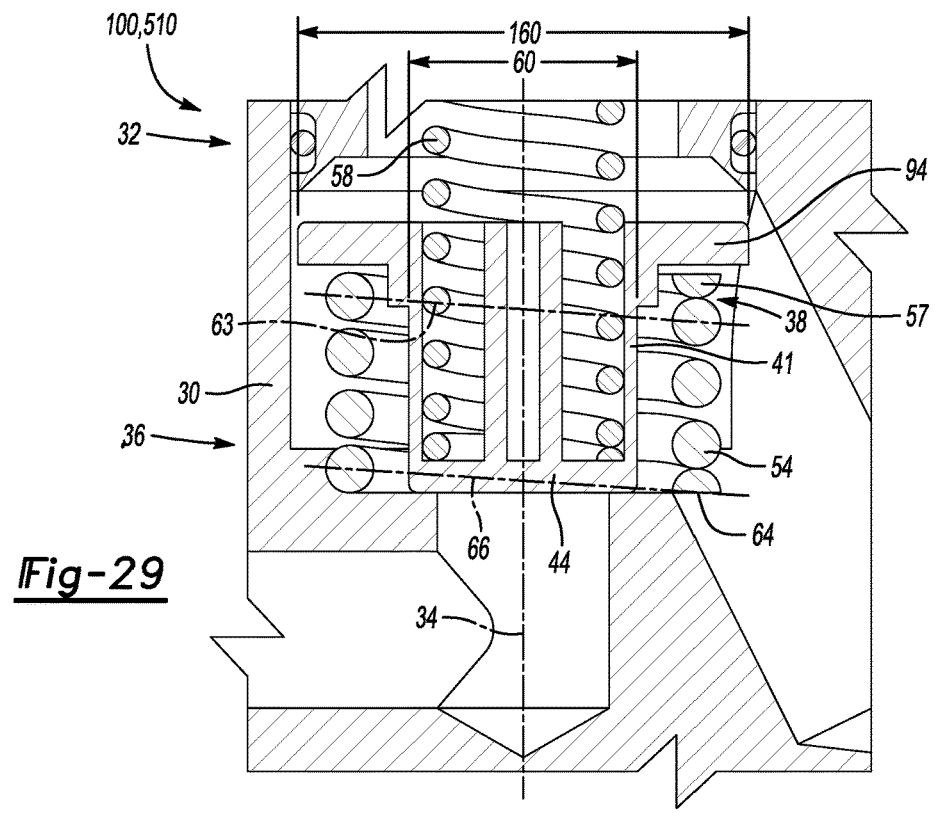
FIG. 29 is a schematic illustration of a cross-sectional view of a third embodiment of the shuttle alignment system of FIG. 24.

Referring now to FIG. 29, in a third embodiment, the body 41 may have the first diameter 60 and the flange 94 may have the second diameter 160 that is from 1.5 times to 2.5 times larger than the first diameter 60. That is, the flange 94 of this embodiment may extend farther from the body 41 than the respective flanges 94 of the first and second embodiments. For example, the second diameter 160 of the flange 94 may be twice as large as the first diameter 60 of the body 41. The top coil 57 may abut and seat against the flange 94 and the bottom coil 64 may abut and seat against the distal end 36. As such, a guide pin (not shown) may not be necessary to guide the shuttle 44 within the housing 30 as the shuttle 44 translates between the first position 20 and the second position 22.

Figure 30:
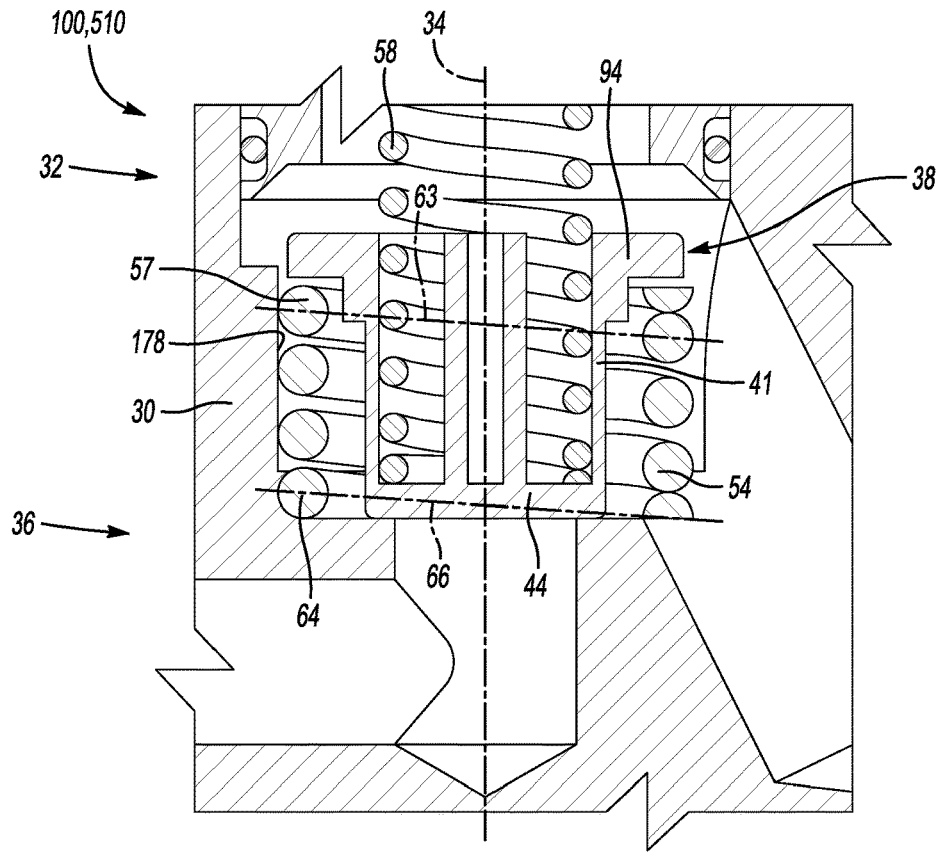
FIG. 30 is a schematic illustration of a cross-sectional view of a fourth embodiment of the shuttle alignment system of FIG. 24.

Referring now to FIG. 30, in a fourth embodiment, the housing 30 may have an internal surface 178 and the compression coil spring 54 may abut the flange 94, the distal end 36, and the internal surface 178. That is, the housing 30 may define a comparatively smaller bore 38 and the internal surface 178 of the housing 30 may guide and accurately align the shuttle 44 as the shuttle 44 translates along the longitudinal axis 34. As such, a guide pin (not shown) may not be necessary to guide the shuttle 44 within the housing 30 as the shuttle 44 translates between the first position 20 and the second position 22.

Figure 31:
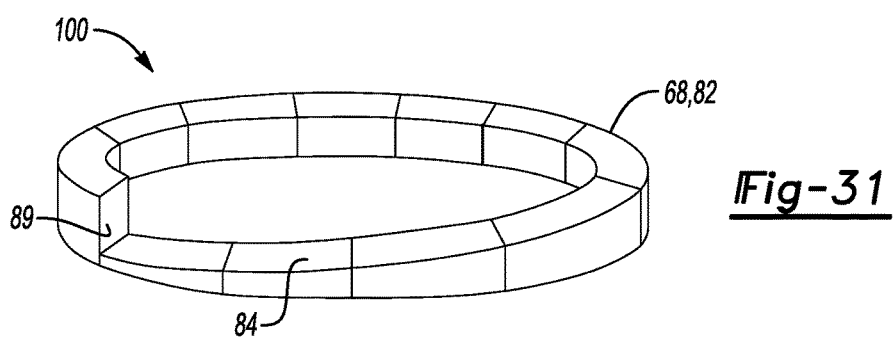
FIG. 31 is a schematic illustration of a perspective view of a first ramp of a fifth embodiment of the shuttle alignment system of FIG. 24.

Referring now to FIG. 31, the shuttle alignment system 100 may further include the first ramp 68 formed from a first material, e.g., aluminum, that is different from the shape memory alloy. The first ramp 68 may be disposed between the flange 94 and the distal end 36, may be circular and coaxial with the longitudinal axis 34, and may abut the top coil 57 and the proximal end 32. Alternatively, the first ramp 68 may abut the bottom coil 64 and the distal end 36. Although not shown, the first ramp 68 may define a plurality of conduits therethrough to allow the fluid 16 to pass through the first ramp 68. The first ramp 68 may be integrated with the housing 30 or the shuttle 44 or may abut the flange 94 or distal end 36.

The shuttle alignment system 100 may further include a second ramp 168 formed from a second material, e.g., aluminum, that is different from the shape memory alloy. The second ramp 168 may be formed from the same material or a different material than the first ramp 68. The second ramp 168 may be disposed opposite the first ramp 68, may be circular and coaxial with the longitudinal axis 34, and may abut the bottom coil 64 and the distal end 36. Alternatively, the second ramp 168 may abut the top coil 57 and the proximal end 32. Although not shown, the second ramp 168 may define a plurality of conduits therethrough to allow the fluid 16 to pass through the second ramp 168. The second ramp 168 may be integrated with the housing 30 or the shuttle 44 or may abut the flange 94 or distal end 36.

It is to be appreciated that in some embodiments, a portion of the shape memory alloy may be annealed such that the portion does not transition between the first state 50 (FIG. 25) and the second state 52 (FIG. 26). For example, at least one of the first end 62 and the second end 162 may be annealed such that the shape memory alloy at the first end 62 and the second end 162 does not transition between the first state 50 and the second state 52.

Figure 32:
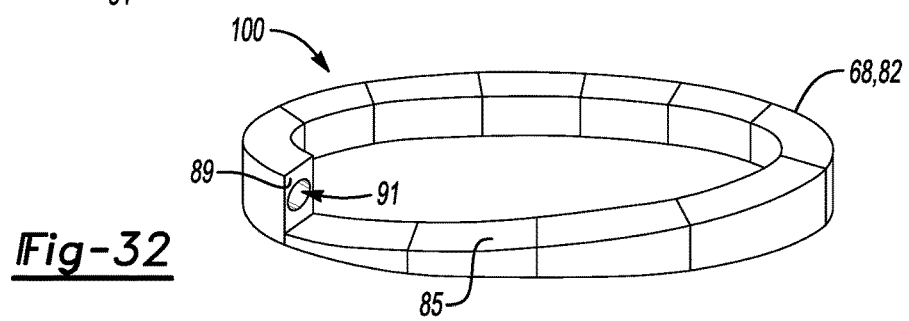
FIG. 32 is a schematic illustration of a perspective view of another embodiment of the first ramp of FIG. 31.
Figure 34:
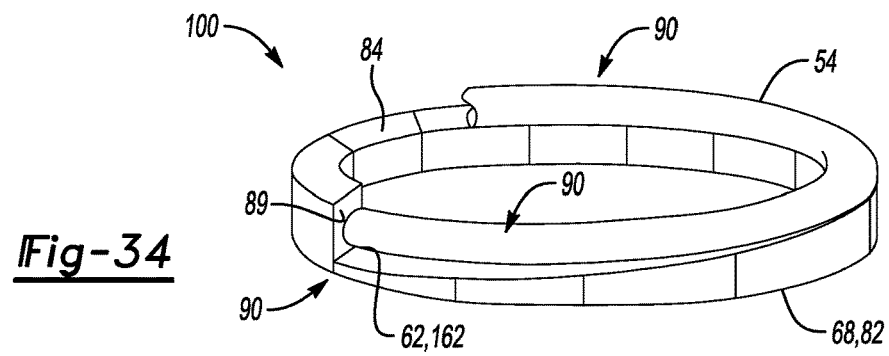
FIG. 34 is a schematic illustration of a perspective view of the first ramp of FIG. 31 attached to a compression coil spring.

Referring now to FIG. 32, the first ramp 68 may have an inclined, circular surface 85 and a vertical surface 89 that is perpendicular to the inclined, circular surface 85. In addition, the vertical surface 89 may define a void 91 therein, and the first end 62 may be disposed within the void 91. Again, the first ramp 68 may seat against the sealing surface 76 of the valve 510, such as the flange 94 or distal end 36. Without changing an orientation of the shape memory alloy, the first end 62 may be disposed within the void 91 so as to anchor the compression coil spring 54. Further, as shown in FIG. 34, the compression coil spring 54 may be attached to the vertical surface 89 and the inclined, circular surface 85 with a plurality of solder joints 90.

Figure 33:
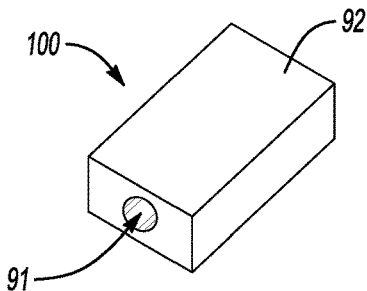
FIG. 33 is a schematic illustration of a perspective view of a block of a sixth embodiment of the shuttle alignment system of FIG. 24.

Referring now to FIG. 33, the shuttle alignment system 100 may further include a block formed from a third material, e.g., aluminum, that is different from the shape memory alloy. The block 92 may define the void 91 therein, and the first end 62 may be disposed within the void 91. Again, the block 92 may rest against the sealing surface 76 of the valve 510, such as the flange 94 or distal end 36. For instance, the block 92 may be disposed between the flange 94 and the distal end 36 and abut the top coil 57. Without changing an orientation of the shape memory alloy, the first end 62 may be disposed within the void 91 so as to anchor the compression coil spring 54.

Figure 35:
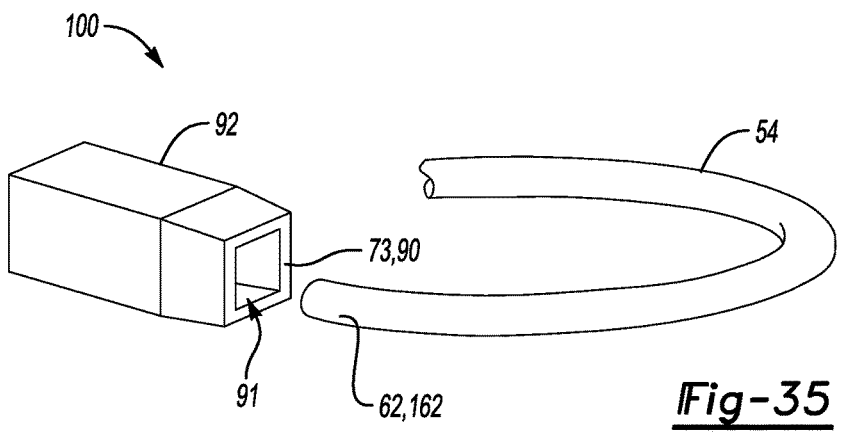
FIG. 35 is a schematic illustration of a perspective view of a second embodiment of the block of FIG. 33.

As shown in FIG. 35, the compression coil spring 54 may be attached to the block 92 within the void 91 with a solder joint 90. That is, the block 92 may be configured as a hollow tube that defines the void 91, and the first end 62 or the second end 162 may be disposed within the void 91 and soldered to the block 92. Alternatively, the compression coil spring 54 may be disposed within the void 91 and attached to the block 92 with the crimp 73. For this configuration, the block 92 or hollow tube may also be bent to follow a curve of the top coil 57 or the bottom coil 64.

Figure 36:
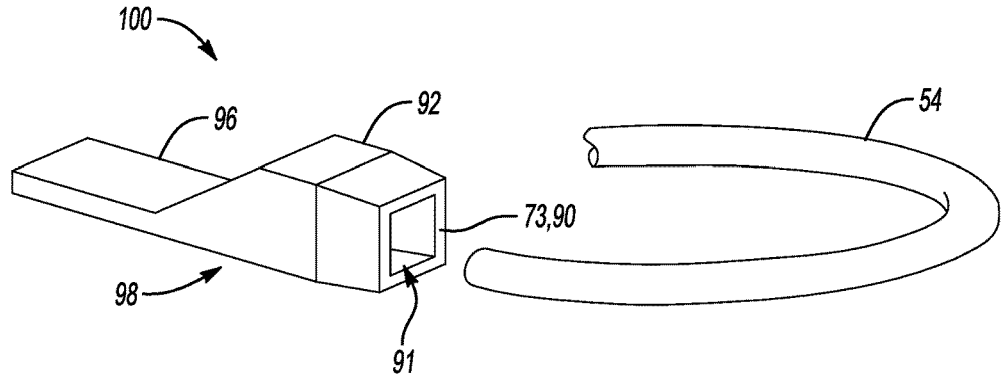
FIG. 36 is a schematic illustration of a perspective view of a third embodiment of the block of FIG. 33.
Figure 37:
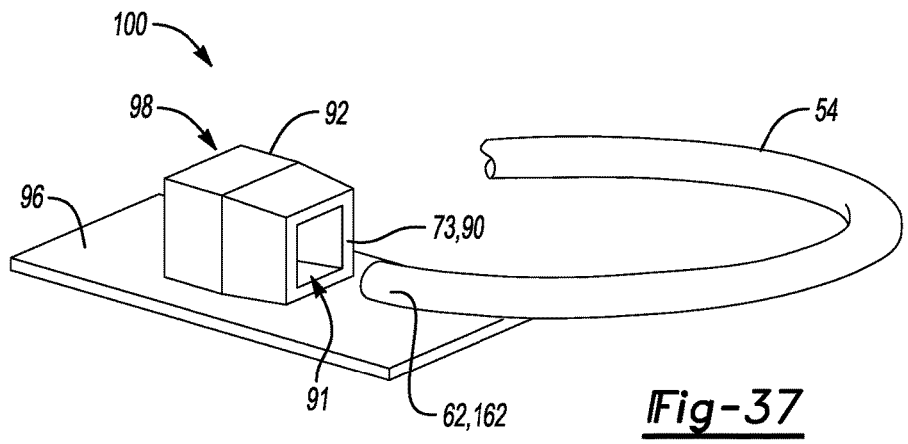
FIG. 37 is a schematic illustration of a perspective view of a fourth embodiment of the block of FIG. 33.

Referring now to FIG. 36, the block 92 may have a flattened end 96 and a non-flattened end 98, wherein the non-flattened end 98 defines the void 91. The flattened end 96 may support another portion of the compression coil spring 54. In another configuration shown in FIG. 37, the flattened end 96 may be bent such that the flattened end 96 folds under and abuts the non-flattened end 98. The first end 62 or the second end 162 may be disposed within the void 91 at the non-flattened end 98 and may be attached to the block 92 with the crimp 73.

Figure 38:
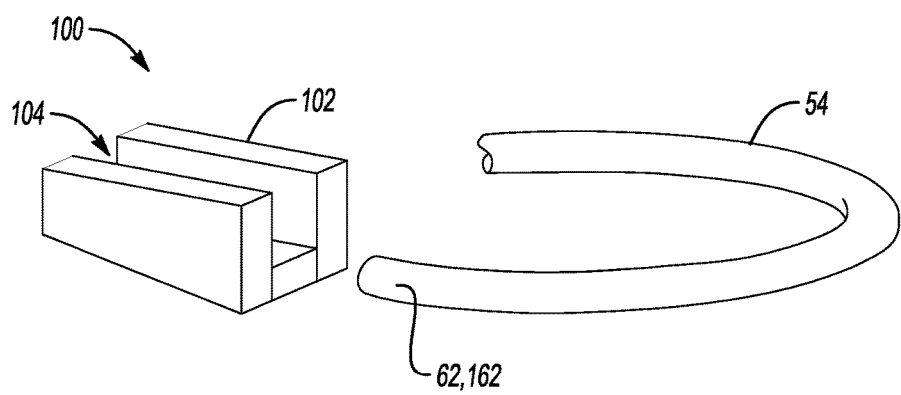
FIG. 38 is a schematic illustration of a perspective view of a guide member of a seventh embodiment of the shuttle alignment system of FIG. 33.

Referring now to FIG. 38, the shuttle alignment system 100 may further include a guide member 102 formed from the third material, e.g., aluminum, that is different from the shape memory alloy. The guide member 102 may define a channel 104 therein and the channel 104 may be formed via stamping or pressing the guide member 102. The guide member 102 may be disposed between the flange 94 and the distal end 36 and may abut the top coil 57. The first end 62 may be disposed within the channel 104. Alternatively, the guide member 102 may be disposed at the distal end 36, and the second end 162 may be disposed within the channel 104.

Figure 39:
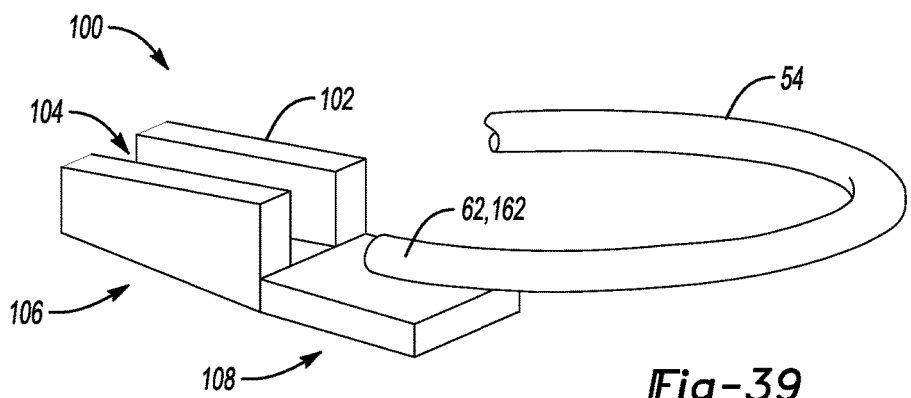
FIG. 39 is a schematic illustration of a perspective view of a further embodiment of the guide member of FIG. 38.

Referring now to FIG. 39, the guide member 102 may further include a channel portion 106 in which the channel 104 is defined, and a support ledge 108 extending from the channel portion 106. The first end 62 may be disposed within the channel portion 106 and may abut the support ledge 108. That is, the support ledge 108 may support the compression coil spring 54.

The aforementioned shuttle alignment systems 100 may ensure that the shuttle 44 efficiently translates along the longitudinal axis 34 during operation.

Therefore, the thermal bypass valve 10, 110, 210, 310, 410, 510, device 12, shuttle alignment system 100, and/or method may provide a shape memory alloy-controlled, on-demand valve that is capable of switching fluid supply according to fluid cooling demands. Such switching may be useful for applications requiring selectively cooling the fluid 16 through the cooler 14. Further, the thermal bypass valve 10, 110, 210, 310, 410, 510 may be economically sized and may contribute to decreased manufacturing costs for the device 12. In addition, the thermal bypass valve 10, 110, 210, 310, 410, 510 is clean, durable, long-lasting, efficient, flexible, and compact in package design.

While the best modes for carrying out the disclosure have been described in detail, those familiar with the art to which this disclosure relates will recognize various alternative designs and embodiments for practicing the disclosure within the scope of the appended claims.

What is claimed is:

1. A thermal bypass valve configured for selectively directing a flow of a fluid from a device to a cooler, the thermal bypass valve comprising:
   a housing having a capped end, a longitudinal axis, and a non-capped end spaced apart from the capped end along the longitudinal axis, the housing defining:
   a bore extending along the longitudinal axis;
   a first inlet port disposed in fluid communication with the bore;
   a second outlet port disposed in fluid communication with the bore and selectively disposable in fluid communication with the first inlet port;
   a third inlet port disposed in fluid communication with the bore and selectively disposable in fluid communication with the second outlet port; and
   a fourth outlet port disposed in fluid communication with the bore and the third inlet port, and selectively disposable in fluid communication with the first inlet port;
   a cap disposed within the bore at the capped end;
   a shuttle disposed within the bore and reversibly translatable towards and away from the cap along the longitudinal axis between:
   a first fill position in which:

the first inlet port is disposed in fluid communication with both the second outlet port and the fourth outlet port; and the third inlet port is disposed in fluid communication with the second outlet port;

a cooling position in which:

the first inlet port is disposed in fluid communication with the fourth outlet port; and the third inlet port is disposed in fluid communication with the second outlet port; and a bypass position in which:

the first inlet port is disposed in fluid communication with the second outlet port; and an actuator configured for translating the shuttle along the longitudinal axis between the cooling position and the bypass position, wherein the actuator is formed from a shape memory alloy and is transitionable between a first state and a second state in response to a temperature of the fluid.

2. The thermal bypass valve of claim 1, wherein the shape memory alloy transitions between the first state and the second state to translate the shuttle from the bypass position to the cooling position.

3. The thermal bypass valve of claim 1, further including a bias resilient member attached to the shuttle and configured for translating the shuttle along the longitudinal axis from the cooling position to the bypass position as the shape memory alloy cools.

4. The thermal bypass valve of claim 3, wherein the shuttle is configured as a cylinder, defines a first cavity therein along the longitudinal axis, and has a first end and a second end spaced apart from the first end;

wherein the cap defines a second cavity therein and has a third end and a fourth end spaced apart from the third end; and further wherein the bias resilient member is disposed within the first cavity and the second cavity, extends from the first end, and is attached to the second end and the third end.

5. The thermal bypass valve of claim 4, wherein the housing defines a shoulder that is aligned with the first end when the shuttle is disposed in the cooling position.

6. The thermal bypass valve of claim 3, wherein the housing includes a first ramp disposed within the bore.

7. The thermal bypass valve of claim 3, wherein the cap further defines a conduit therein along the longitudinal axis that is configured for transmitting the fluid from the first inlet port to the second outlet port when the shuttle is disposed in one of the first fill position and the bypass position.

8. The thermal bypass valve of claim 7, wherein the shuttle defines a first channel therein that is coaxial with the conduit;

wherein the shuttle has a first end and a second end spaced apart from the first end;

wherein the cap defines a second channel therein along the longitudinal axis and has a third end and a fourth end spaced apart from the third end; and further wherein the bias resilient member is disposed within the first channel and the second channel and extends from the first end and the fourth end.

9. The thermal bypass valve of claim 3, wherein the second outlet port is disposed at the non-capped end;

wherein the third inlet port is disposed at the non-capped end and is disposed between the first inlet port and the non-capped end;

wherein the fourth outlet port is disposed at the capped end; and further wherein the shuttle is disposed within the bore between the cap and the non-capped end.

10. The thermal bypass valve of claim 9, wherein the shuttle has a first end, a second end spaced apart from the first end, and a flange disposed between the first end and the second end;

wherein the cap has a third end and a fourth end spaced apart from the third end;

wherein the bias resilient member is coiled about the shuttle at the second end; and further wherein the actuator is coiled about the shuttle and disposed between the flange and the cap at the first end.

11. The thermal bypass valve of claim 10, wherein the second end seals against the housing and the first end is spaced apart from the cap when the shuttle is disposed in the cooling position so that the fluid flows to the cooler.

12. The thermal bypass valve of claim 10, wherein the first end seals against the cap and the second end is spaced apart from the housing when the shuttle is disposed in the bypass position so that the fluid does not flow to the cooler.

13. The thermal bypass valve of claim 10, wherein the first end is spaced apart from the cap and the second end is spaced apart from the housing when the shuttle is disposed in the first fill position so that the fluid flows to the cooler.

* * * * *